(12) United States Patent
Miles et al.

(10) Patent No.: US 7,773,608 B2
(45) Date of Patent: *Aug. 10, 2010

(54) PORT-TO-PORT, NON-BLOCKING, SCALABLE OPTICAL ROUTER ARCHITECTURE AND METHOD FOR ROUTING OPTICAL TRAFFIC

(76) Inventors: Larry L. Miles, 1117 Vicksburg Dr., Garland, TX (US) 75041; Lakshman S. Tamil, 4812 Holly Berry Dr., Plano, TX (US) 75093; Scott A. Rothrock, 3456 Grand Mesa, Plano, TX (US) 75025; Noland J. Posey, Jr., 12100 Metric Blvd. #1716, Austin, TX (US) 78758; Gregory H. Aicklen, 520 Lexington La., Richardson, TX (US) 75080

( * ) Notice: Subject to any disclaimer, the term of this patent is extended or adjusted under 35 U.S.C. 154(b) by 0 days.

This patent is subject to a terminal disclaimer.

(21) Appl. No.: 12/210,768

(22) Filed: Sep. 15, 2008

(65) Prior Publication Data
US 2009/0074414 A1    Mar. 19, 2009

Related U.S. Application Data

(63) Continuation of application No. 10/115,564, filed on Apr. 3, 2002, now Pat. No. 7,426,210.

(60) Provisional application No. 60/281,176, filed on Apr. 3, 2001.

(51) Int. Cl.
*H04L 12/56* (2006.01)
(52) U.S. Cl. .................. 370/400; 370/429; 398/47
(58) Field of Classification Search .......... 370/400, 370/401, 402, 422, 423, 427, 428, 429, 430, 370/531–545; 398/45, 47, 49, 50
See application file for complete search history.

(56) References Cited

U.S. PATENT DOCUMENTS

| 5,005,166 | A | 4/1991 | Suzuki et al. |
| 5,416,769 | A | 5/1995 | Karol |
| 5,469,284 | A | 11/1995 | Haas |
| 5,486,943 | A | 1/1996 | Sasayama et al. |
| 5,734,486 | A | 3/1998 | Guillemot et al. |
| 5,737,106 | A | 4/1998 | Sansonetti et al. |
| 6,477,166 | B1 | 11/2002 | Sanzi et al. |
| 6,486,983 | B1 | 11/2002 | Beshai et al. |

(Continued)

OTHER PUBLICATIONS

G. Depovere, et al., Philips Research Laboratories, "A Flexible Cross-Connect Network Using Multiple Object Carriers," Date Unknown, All Pages.

(Continued)

*Primary Examiner*—Chi H. Pham
*Assistant Examiner*—Kevin Mew
(74) *Attorney, Agent, or Firm*—Connolly Bove Lodge & Hutz LLP

(57) ABSTRACT

A router, comprising: a core controller; a plurality of egress edge units coupled to said core controller, said plurality of egress edge units including at least one egress port; and a plurality of ingress edge units coupled to said core controller and in communication with said plurality of egress edge units, wherein each ingress edge unit comprises: a plurality of ingress ports; an ingress interface associated with each ingress port, each ingress interface operable to segregate incoming optical data into a plurality of subflows, wherein each subflow contains data intended for a particular destination port; and a TWDM multiplexer operable to: receive subflows; generate a micro lambda from each subflow; time multiplex each micro lambda according to a schedule pattern; wavelength multiplex each micro lambda; and transmit each micro lambda to a switch fabric according to the schedule pattern.

11 Claims, 18 Drawing Sheets

U.S. PATENT DOCUMENTS

| | | | |
|---|---|---|---|
| 6,512,612 B1 | 1/2003 | Fatehi et al. | |
| 6,665,495 B1 | 12/2003 | Miles et al. | |
| 6,721,315 B1* | 4/2004 | Xiong et al. | 370/389 |
| 6,876,649 B1 | 4/2005 | Beshai et al. | |
| 6,882,799 B1 | 4/2005 | Beshai et al. | |
| 6,920,131 B2 | 7/2005 | Beshai et al. | |
| 6,943,925 B1 | 9/2005 | Islam | |
| 6,963,561 B1* | 11/2005 | Lahat | 370/356 |
| 6,973,229 B1 | 12/2005 | Tzathas et al. | |
| 7,013,084 B2* | 3/2006 | Battou et al. | 398/45 |
| 7,272,309 B1* | 9/2007 | Tamil et al. | 398/47 |
| 7,298,694 B2* | 11/2007 | Kamiya et al. | 370/218 |
| 2001/0021189 A1 | 9/2001 | Shiota | |
| 2002/0054732 A1 | 5/2002 | Zheng | |
| 2002/0118419 A1* | 8/2002 | Zheng et al. | 359/139 |
| 2002/0118421 A1* | 8/2002 | Xiong et al. | 359/140 |
| 2005/0063370 A1* | 3/2005 | Beshai et al. | 370/360 |
| 2006/0245423 A1* | 11/2006 | Best et al. | 370/360 |
| 2008/0138067 A1* | 6/2008 | Beshai | 398/45 |
| 2009/0028560 A1* | 1/2009 | Best et al. | 398/45 |
| 2009/0142055 A1* | 6/2009 | Qiu et al. | 398/45 |

OTHER PUBLICATIONS

John M. Senoir, et al., SPIE—The International Society for Optical Engineering, "All-Optical Networking 1999: Architecture, Control, and Management Issues" vol. 3843, pp. 111-119, dated Sep. 19-21, 1999.

Jonathan S. Turner, Journal of High Speed Networks 8 (1999) 3-16 IOS Press, "Terabit Burst Switching", pp. 3-16.

Ken-ichi Sato, IEEE Journal on Selected Areas in Communications, vol. 12, No. 1, Jan. 1994 "Network Performance and Integrity Enhancement with Optical Path Layer Technologies", pp. 159-170.

F. Callegati, et al., Optical Fiber Technology 4, 1998 "Architecture and Performance of a Broadcast and Select Photonic Switch*", pp. 266-284.

Soeren Lykke Danielsen, et al., "WDM Packet Switch Architectures and Analysis of the Influence of Tuneable Wavelength Converters on the Performance".

Soeren L. Danielsen, et al., IEEE Photonics Technology Letters, vol. 10, No. 6, Jun. 1998 "Optical Packet Switched Network Layer Without Optical Buffers".

John M. Senoir, et al., SPIE—The International Society of Optical Engineering, All-Optical Networking: Architecture, Control and management Issues dated Nov. 3-5, 1998, vol. 3531, pp. 455-464.

M.C. Chia et al., Part of SPIE Conference on All-Optical Networking: Architecture, Control and Management Issues, Nov. 1998, "Performance of Feedback and Feedforward Arrayed-Waveguide Gratings-Based Optical Packet Switches with WDM Inputs/Outputs".

* cited by examiner

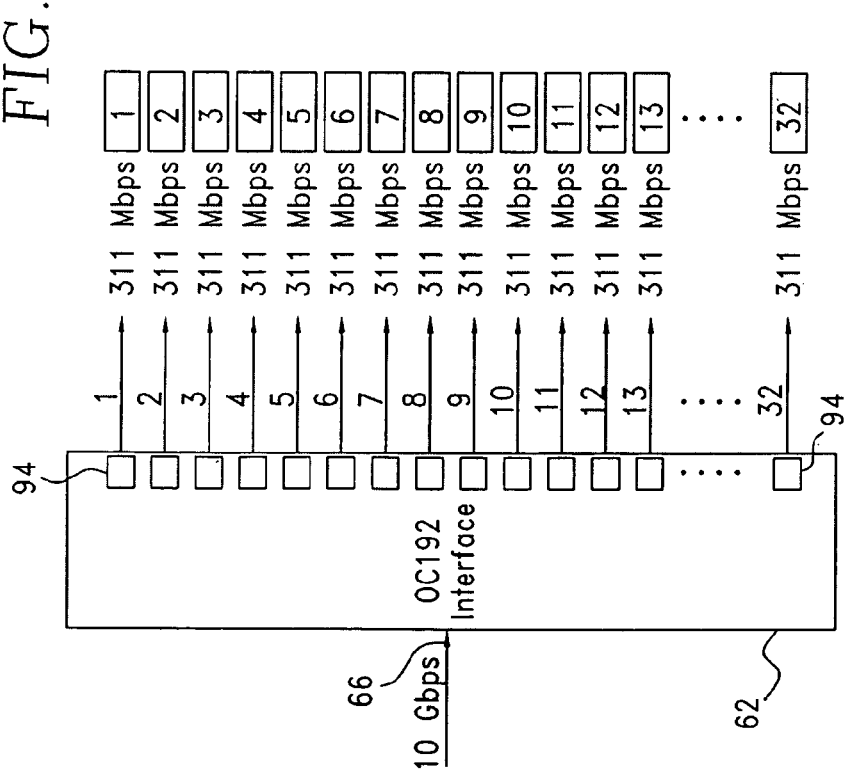
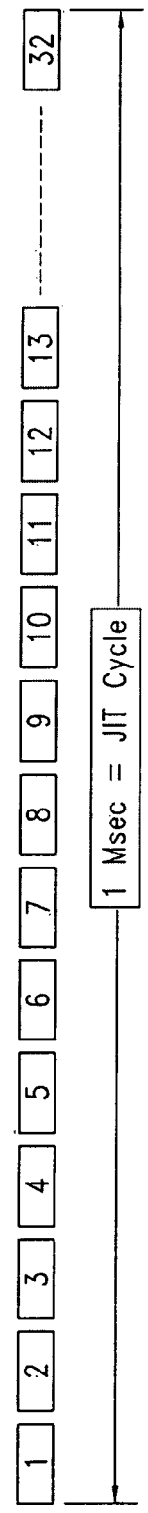
FIG. 10A
FIG. 10B

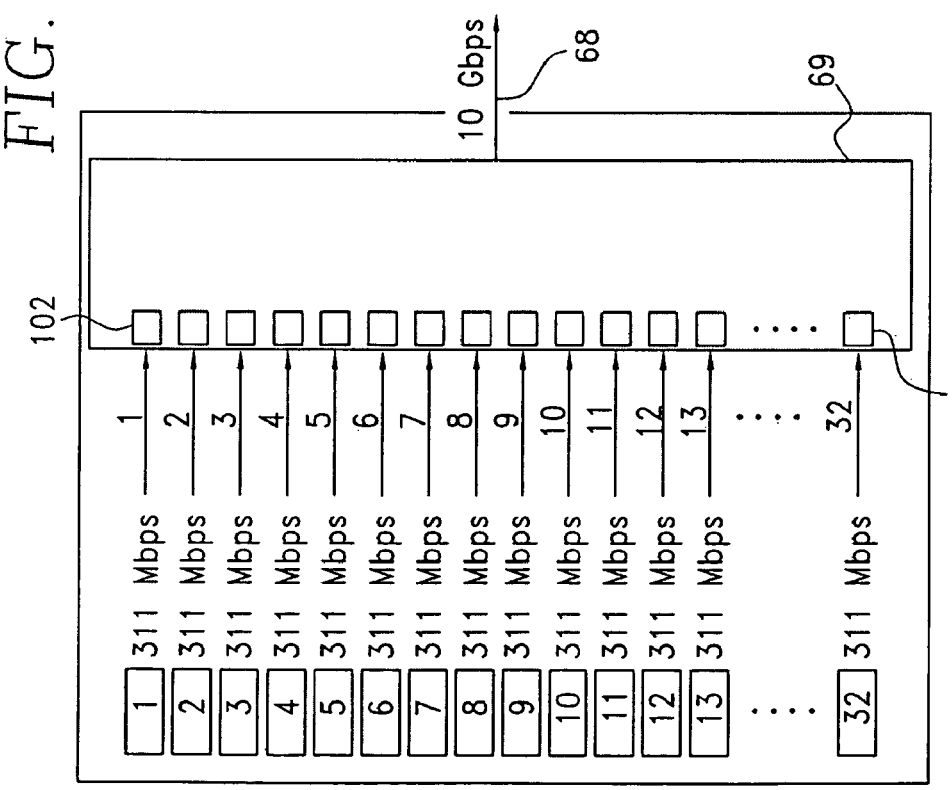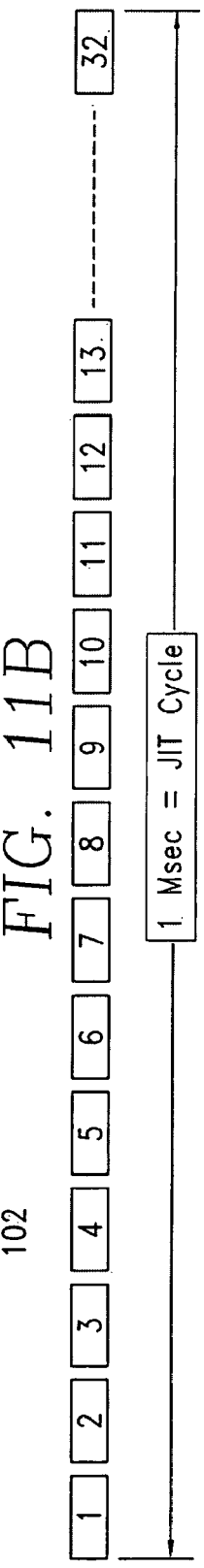

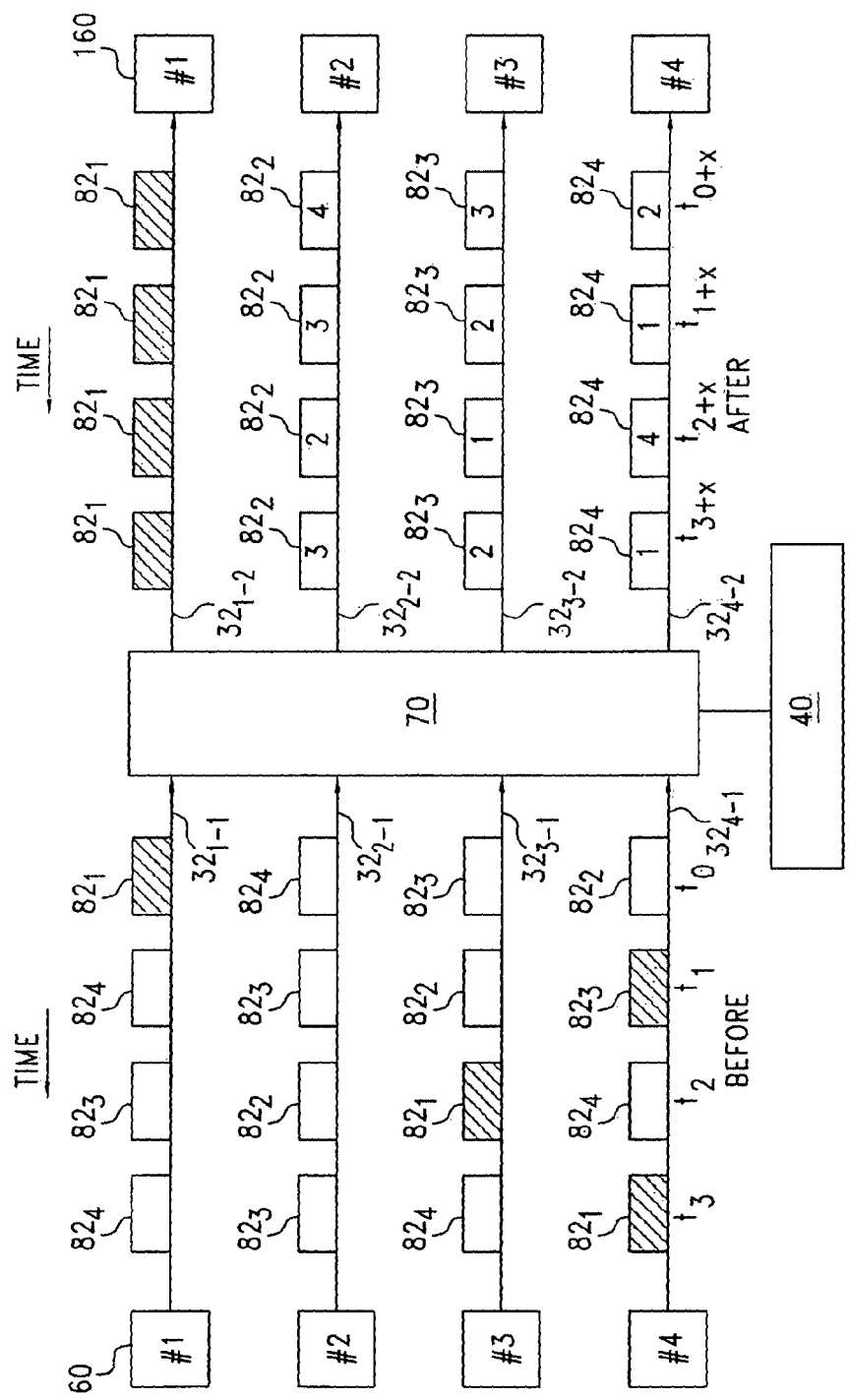

PORT-TO-PORT, NON-BLOCKING, SCALABLE OPTICAL ROUTER ARCHITECTURE AND METHOD FOR ROUTING OPTICAL TRAFFIC

RELATED APPLICATIONS

This application claims priority under 35 U.S.C. §119 to U.S. Provisional Patent Application No. 60/281,176 entitled "System and Method for Scalable Architecture System" and filed on Apr. 3, 2001, which is hereby fully incorporated by reference herein.

TECHNICAL FIELD OF THE INVENTION

The present invention relates generally to telecommunications systems and methods, and more particularly, a non-blocking, scalable optical router having an architecture that routes data from an ingress port to an egress port through a non-blocking switch using time wave division multiplexing (TWDM).

BACKGROUND OF THE INVENTION

The emergence of the Internet and the reliance by business and consumers on the transfer of data in all daily activities requires telecommunications networks and components that can deliver ever increasing amounts of data at faster speeds with higher quality levels. Current telecommunications networks fail to meet these requirements. Currently, data networks are constructed with a variety of switches and routers that are interconnected, typically as a full or partial mesh, in order to attempt to provide connectivity for data transport over a large geographic area.

In order to try to meet the increasing bandwidth requirements in these networks, in very large Internet Protocol (IP) networks, aggregation routers at the fringes of the network will feed large amounts of data to a hierarchy of increasingly large optical cross-connects within a mesh network. These existing switching architectures are limited in the switching speeds and data capacity that can be processed between switches in a non-blocking manner. Current electrical switching architectures are generally limited to a switching speed of 40-100 Gigabits. In an attempt to overcome this limitation, current electrical and optical routers use this aggregation of slower switches to increase the overall switching speed of the router. For example, a system may combine a hundred one (1) Gigabit routers to increase the switching speed of the system. However, while the overall speed and capacity will exceed one Gigabit, this aggregation will not result in full 100 Gigabit per second speed and capacity, resulting in a decreased efficiency (less than full realization of switching capability). Furthermore, aggregation increases costs due to the increased number of routers and increases complexity due to interconnect and routing issues. In addition to the issues surrounding data routing speed, electronic telecommunication routing systems all face difficult transference issues when interfacing with optical data packets. Another technique-used in electrical telecommunication routing systems to increase data routing speed is parallel processing. However, this technique has its own limitations including control complexity (it is difficult to control the multiple routers operating in parallel). In any of these techniques involving multiple routers to increase the processing speed, a single control machine must arbitrate among the many multiple machines that increases control complexity cost and ultimately uses an electronic control machine that is limited by electronic processing speeds.

FIGS. 1 and 2 will illustrate the limitations of these prior art systems. FIG. 1 shows a typical prior art local network cluster 10 that uses an interconnect structure with multiple routers and switches to provide the local geographic area with a bandwidth capability greater than that possible with any one switch in the router 10. Network 10 includes four routers 12, which will be assumed to be 300 Gigabit per second routers, each of which serves a separate area of 150 Gbps of local traffic. Thus, the 300 Gigabit capacity is divided by assigning 150 Gigabits per second (Gbps) to the incoming traffic on local traffic links 16 and assigning 50 Gbps to each of three links 14. Thus, each link 14 connects the router 12 to every other router in the network 10, thereby consuming the other 150 gigabit capacity of the router 12. This interconnectivity is in the form of a balanced "mesh" that allows each router 12 to communicate directly with every other router 12 in the network 10.

This configuration has a number of limitations. While the four local geographic areas produce a total of 600 Gbps of capacity, the network 10 requires four routers 12 of 300 Gbps each, or 1200 Gbps of total router capacity, to provide the interconnectivity required to allow direct communication between all routers 12. Additionally, even though fully connected, each router 12 does not have access to all of the capacity from any other router 12. Thus, only one third of the local traffic (i.e., only 50 Gbps of the total potential 150 Gbps) can be switched directly from any one router 12 to another router 12, and the total potential traffic demand is 600 Gigabits per second. In order to carry more traffic over a link 14, a larger capacity would be required at each router 12 (for example, to carry all 150 Gbps over a link 14 between routers, each link 14 would need to be a 150 Gbps link and each router 12 would have to have an additional 300 Gbps capacity). Thus, to get full connectivity and full capacity, a non-blocking cluster network 10 having a mesh configuration would require routers with 600 Gbps capacity each which equates to 2400 Gbps total router capacity (or four times the combined traffic capacity of the local geographic areas).

FIG. 2 shows another prior art optical cross-connect mesh network 18 that aggregates sixteen data lines 20 that each can carry up to one hundred sixty gigabit per second of data that appears to have the potential capacity of 2.5 Terabits (16 lines carrying 160 Gbps each). Each of the data lines 20 is routed through an edge router 22 to an interconnected edge network 24 (e.g., a ring, mesh, ADM backbone or other known interconnection method) via carrying lines 26. However, due to inefficiencies in this network configuration (as described above), the full potential of 2.5 Terabits cannot be achieved without a tremendous increase in the size of the edge routers 22. For example, if the edge routers are each 320 Gbps routers, then 160 Gbps is used to take incoming data from incoming data line 20 and only 160 Gbps of access remains to send data to each of the other fifteen routers 22 in the cluster 18 (i.e., approximately 10 Gbps can be allotted to each of the other fifteen routers, resulting in greater than 90% blockage of data between routers). Furthermore, the capacity of the routers is already underutilized as the overall router capacity of the network cluster 18 is 5 terabits per second (Tbps), while the data capacity actually being serviced is 2.5 Tbps. Even with the router capacity underutilized, the network 18 has over 90% blockage between interconnected routers through the edge network 24. To increase the capacity between routers in a non-blocking manner, the individual routers would need to be increased in capacity tremendously, which increases cost and further exacerbates the underutilization problems already existing in the network.

FIG. 3 illustrates a typical hierarchy of an example prior art network 11 consisting of smaller routers 23 connected to larger aggregation routers 21 which in turn connect to a connected network 27 of optical cross-connects 25 for transport of IP data in a circuit switched fashion utilizing waves or lambdas (i.e., one lambda per switched circuit path). Even though the larger aggregation routers 21 have high capacity for IP data traffic, these larger aggregation routers 21 require even larger capacity optical cross-connects 25 to establish the connectivity to the other aggregation routers 21 in order to communicate data. The optical cross-connects 25, although extremely large in capacity (e.g., on the order of 10 to 100 times the capacity of the aggregation routers 21), nevertheless require multiple units interconnected as a mesh in order to provide the total capacity needed for the combined data capacity of the aggregation routers 21 taken together. The aggregation routers 21 simply do not have sufficient port capacity to be able to communicate with their peers without the aid of the optical cross-connect mesh network 27 for sufficient transport capacity. In addition, no single optical cross-connect 25 has sufficient capacity to carry all of the aggregation router 21 traffic. Therefore, multiple optical cross-connect units 25 meshed together in a network 27 are required to carry the total aggregation router 21 IP traffic of the network 11 in a distributed fashion.

In addition, network 11 of FIG. 3 suffers from severe blocking because each aggregation router 21 cannot dynamically communicate all of its data at any one time to any of its peer aggregation routers 21 in network 11. Moreover, the optical cross-connect network 27 has a relatively static configuration that can only transport a fraction of any particular aggregation router's 21 data to the other aggregation routers 21 in the network 11. Even though the optical cross-connect network 27 utilizes a large number of high capacity optical cross-connects 25, the cross-connect network 27 has the limitation of a large number of inter-machine trunks that are required between cross-connect units 25 in order for the mesh to have sufficient capacity to support the total data transport requirement of all of the aggregation routers 21. Unfortunately, the inter-machine trunks between the optical cross-connects 25 consume capacity at the expense of ports that could otherwise be used for additional aggregation router 21 capacity. Therefore, the network 11 is a "port-poor" network that is generally inefficient, costly, and unable to accommodate the dynamic bandwidth and connectivity requirements of an ever changing, high capacity IP network.

Therefore, a need exists for an optical telecommunications network and switching architecture that will provide full, non-blocking routing between edge routers in a network on a port-to-port (i.e., ingress port to egress port) basis and controlled at the input (ingress) side of the routing network.

SUMMARY OF THE INVENTION

The present invention provides a non-blocking optical routing system and method that substantially eliminates or reduces disadvantages and problems associated with previously developed optical routing systems and methods.

More specifically, the present invention provides a system and method for providing non-blocking routing of optical data through a telecommunications network on a port-to-port basis to maximize utilization of available capacity while reducing routing complexity. The network includes a number of data links that carry optical data to and from an optical router. The optical router includes a number of ingress edge units coupled to an optical switch core coupled further to a number of egress edge units. The ingress edge units receive the optical data from the data links and convert the optical data into "$\mu\lambda$s" where each $\mu\lambda$ is to be routed to a particular destination egress edge port. The $\mu\lambda$s are sent from the ingress edge units to an optical switch fabric within the optical switch core that routes each $\mu\lambda$ through the optical switch fabric to the $\mu\lambda$'s particular destination egress edge unit in a non-blocking manner (i.e., without contention or data loss through the optical switch fabric). This routing is managed by a core controller that monitors the flow of incoming optical data packets into each ingress edge unit, controls the generation of $\mu\lambda$s from the incoming optical data packets and transmission of $\mu\lambda$s to the optical switch fabric and schedules each $\mu\lambda$ to exit the optical switch fabric so as to avoid contention among the plurality of $\mu\lambda$s in the transmission between the optical switch fabric and the egress edge units. The core controller monitors traffic characteristics such as incoming traffic demand at each ingress edge unit, traffic routing demand to each egress edge unit, quality of service requirements, and other data to compute a scheduling pattern for sending $\mu\lambda$s to the optical switch fabric. The core controller then schedules $\mu\lambda$s based on the scheduling pattern (which is updated as the data traffic characteristics change). The egress edge units receive the $\mu\lambda$s, convert the $\mu\lambda$s into an outgoing optical data stream, and transmit the optical data stream to the data lines.

The present invention provides an important technical advantage by combining cross-connect and router capabilities into a single system that uses time wave division multiplexing (TWDM) utilizing wave slots to transport blocks of data through a core switch fabric in a non-blocking manner. This TWDM wave slot transport mechanism allows for switching of both synchronous and asynchronous traffic.

The present invention provides another technical advantage by using a non-blocking cross bar switch that, in conjunction with the TWDM wave slot transport scheme of the present invention, can provide non-blocking transport for high capacity transport systems with fewer or no layers of cross connect switches. Removal of multiple layers of switching cores provides a significant cost advantage.

The present invention provides yet another important technical advantage by providing routing of optical data directly from an ingress (incoming) port to an egress (destination) port within a switching network in a non-blocking manner while performing all or nearly all of the control and routing functions at the ingress router to greatly reduce the complexity of the egress router.

The present invention provides another important technical advantage increasing data throughput with no (or reduced) data loss due to congestion or contention within or collisions between optical data packets in an optical switching core of the optical routing system of the present invention.

The present invention provides another important technical advantage by providing non-blocking data processing (switching and routing) without increasing the individual router/switch capacity beyond the capacity being serviced.

The present invention provides yet another technical advantage by converting the received incoming optical data into $\mu\lambda$s for transport through the optical switch/router in order to optimize throughput through the switch/router.

The present invention can also be incorporated into an optical telecommunications network that includes all of the technical advantages inherent in optical systems (e.g., increased speed, the ability to send multiple packets simultaneously over a single fiber, etc.).

The present invention provides yet another technical advantage by allowing for slot deflection routing in the event of over-utilization and/or under-utilization of various edge routers in the network to provide greater throughput through the switch core.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 10A illustrates the division of an incoming data flow into subflows and FIG. 10B provides an example schedule for sampling the subflows;

FIG. 11A illustrates the concatenation of incoming subflows into an outgoing data stream and FIG. 11B illustrates an example schedule for sampling the subflows;

FIG. 16 shows an example of an optical switching pattern according to one embodiment of the present invention for an uneven traffic distribution;

DETAILED DESCRIPTION OF THE INVENTION

Figure 1:
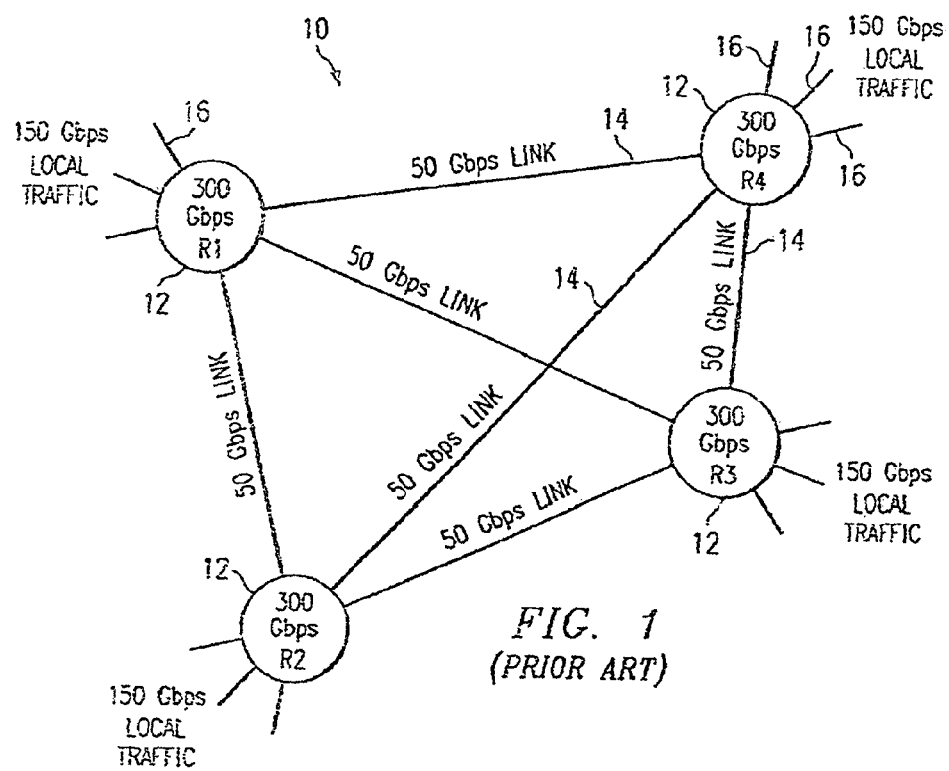
FIG. 1 shows a prior art telecommunications router network.

Preferred embodiments of the present invention are illustrated in the FIGURES, like numerals being used to refer to like and corresponding parts of the various drawings.

Embodiments of the present invention provide an optical network and switch architecture that provides non-blocking routing from an ingress router to an egress router in the network on a port-to-port basis. The present invention provides routing for fixed and variable length optical data packets of varying types (including Internet Protocol (IP), data, voice, TOM, ATM, voice over data, etc.) at speeds from sub-Terabit per second (Tbps) to significantly in excess of Petabit per second (Pbps). The present invention includes the functionality of both large IP routers and optical cross-connects combined with a unique, non-blocking optical switching and routing techniques to obtain benefits in speed and interconnected capacity in a data transport network. The present invention can utilize a TWDM wave slot transport scheme in conjunction with a just-in-time scheduling pattern and a unique optical switch configuration that provides for non-blocking transport of data from ingress to egress.

For purposes of the present invention, the following list is a glossary of terms that shall have at least the meanings provided: "DiffServ" shall mean Differentiated Services (RFC-2474); "DWDM" shall mean dense wave division multiplexing; "Egress" shall mean the output (outbound) side of a router/switch; "EMI" shall mean electro-magnetic interference (radiation of electrical signals and or noise); "Gbps" shall mean Gigabits per second (ten to the power of +9 or one billion); "GES" shall mean Gigabit Ethernet Switch; "Ingress" shall mean the input (inbound) side of a router/switch; "IP" shall mean Internet Protocol; "JIT" shall mean Just In Time; "Lambda" or "λ" shall mean an optical signal at a specific wavelength (usually associated with DWDM); "Micro-Lambda" or "μλ" shall mean a simultaneous burst of multiple λs in a TWDM cycle; "MPLS" shall mean Multi-Protocol Label Switching (RFC-2702); "Non-Blocking" shall mean the characteristic of data switching where an output port of a switch fabric (matrix) can connect to any switch fabric (matrix) input port regardless of any other I/O connections through the switch fabric (matrix); "One Erlang" shall mean the situation during which channel capacity of transport media is occupied 100%; "Petabits" shall mean one thousand terabits (ten to the power of +15 or one million billion); "PKT" shall mean variable length packet data; "SONET" shall mean a Synchronous Optical NETwork; "Tbps" shall mean terabits per second (ten to the power of +12 or one trillion); "TDM" shall mean Time Domain Multiplexing, typically of constant, circuit switched fixed bandwidth data; "TWDM" shall mean Time-Wavelength Division Multiplexing; "TWDM Cycle" shall mean a JIT scheduled group of time-multiplexed Wave Slots with specific port connections; "Virtual Lambda" or "Virtual Wave" shall mean a hypothetical continuous wave equivalent to the TDM bandwidth of a μλ; "Wave Slot" shall mean a time period for the transport of a simultaneous burst of multiple λs in a TWDM cycle.

Figure 2:
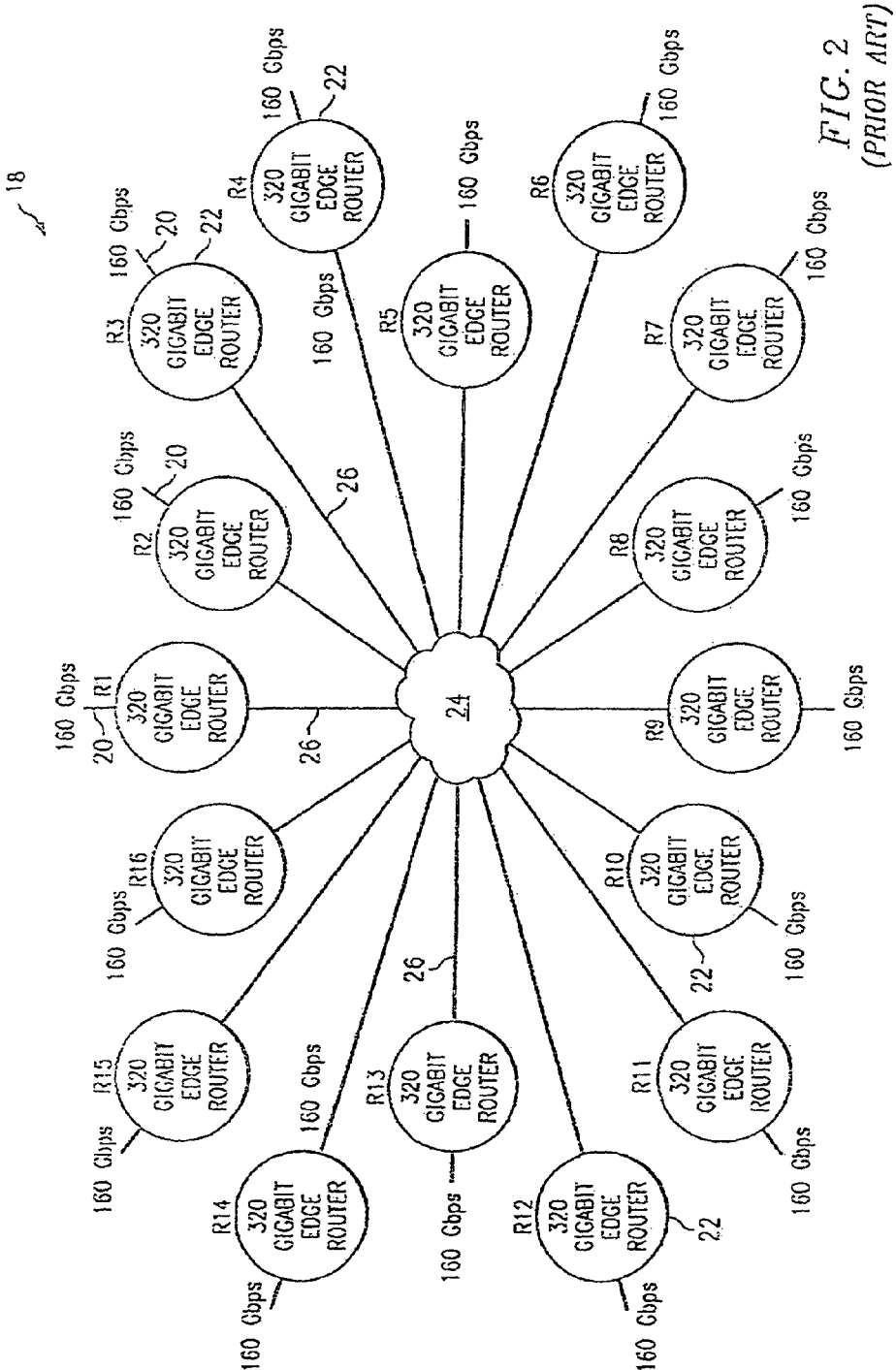
FIG. 2 shows another prior art telecommunications router configuration.
Figure 3:
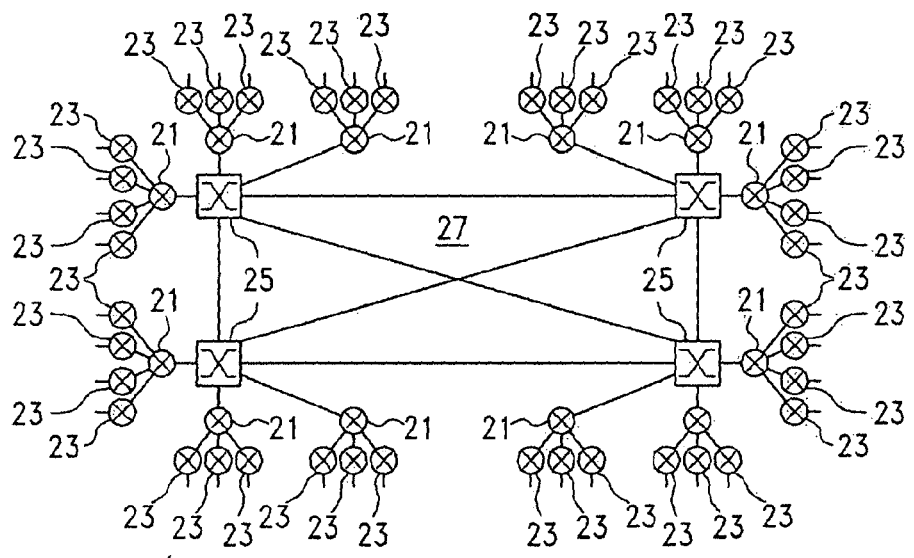
FIG. 3 illustrates a typical hierarchy of an example network consisting of smaller routers connected to larger aggregation routers which in turn connect to a connected network of optical cross-connects for transport of IP data in a circuit switched fashion.
Figure 4:
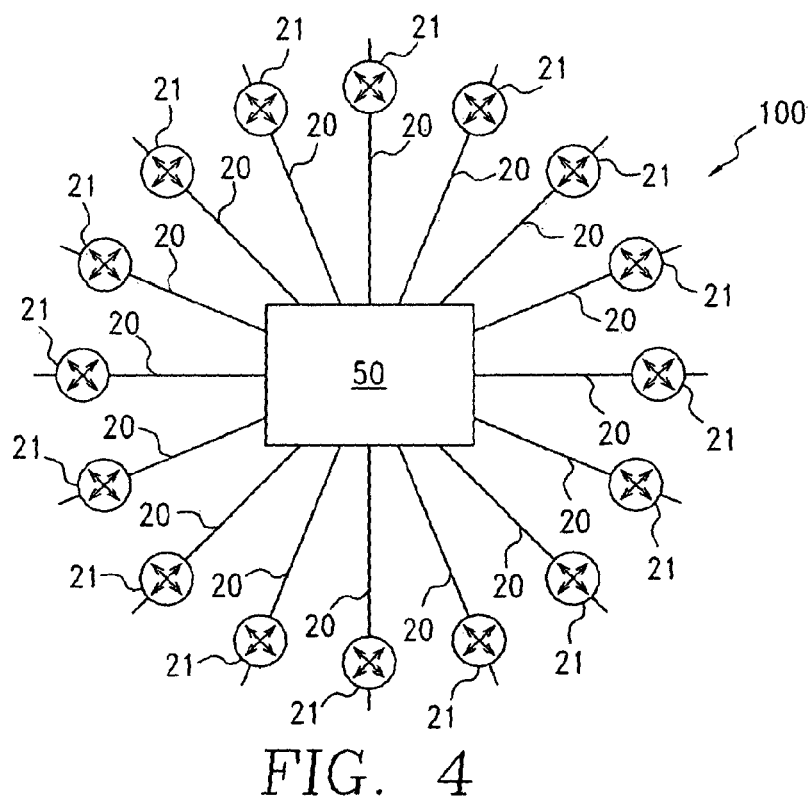
FIG. 4 is an overview diagrammatic representation of one embodiment of an optical telecommunications switch/router according to the present invention.

FIG. 4 illustrates an example of an optical network 100 of the present invention including a number of data links 20 (or "data lines 20") carrying optical data directly to a central optical router 50 from a number of edge routers 21 (e.g., IP routers). The data links 20 can be optical links comprising fiber optic cable operable to carry optical data packets, typically where each fiber optic cable can carry data on multiple wavelengths. In one embodiment, the network 100 shown in FIG. 4 can include sixteen data links 20 where each data link has a data capacity of 160 Gigabits per second (Gbps). Therefore, the network 100 of FIG. 4 has the same potential data capacity of the network of FIG. 2 (approximately 2.5 Tbps). However, unlike FIG. 2, the optical network 100 of FIG. 3 has replaced the sixteen individual routers 12 and the interconnected edge network 24 with a single optical router 50 according to the present invention. Each of the data links 20 transmits optical data packets directly to optical router 50 for further processing. The optical router 50 can route any amount of data received from any single data line 20 to any other data line 20 in a non-blocking manner, thus providing full interconnectivity between data lines 20 in the network 100, thereby providing the potential for full capacity utilization. The optical router 50 optimizes bandwidth management to maximize throughput from ingress ports to egress ports through router 50 with little or no data loss due to data packet congestion or conflict. As compared to the prior art of FIG. 2, the present invention has eliminated the intermediate routers (and their associated underutilized capacity) and the interconnected edge network with a single optical router 50. Optical router 50 of the present invention offers non-blocking access to all the communities serviced by IP routers 21 without requiring additional switch capacity or interface ports beyond those being serviced already.

It should be understood that while many of the embodiments shown in the FIGURES will describe specific bandwidth architectures (e.g., 2.5 Gbps, 10 Gbps, 40 Gbps), the present invention is fully scalable to comprise different numbers of links, different link I/O formats, different data capacities per links, different sized optical routers and other different formats/capacities. Thus, the present invention is fully applicable to networks with total data transport capacities much less than 1 Tbps and significantly in excess of 1 Pbps and the general architectures described are not in any way limited to the specific embodiments which are provided by way of example only. It should be further understood that the "optical router 50" of the present invention includes the functions of switching (e.g., cross connect functionality) and routing and is not limited to traditional "routing" functions, but includes the ability to do both switching and routing. For example, the optical router 50 can replace constant bandwidth switches that are used in public switched transport network that exists today that carries constant bandwidth voice or video data (e.g., TDM data). Additionally, the optical router 50 of the present invention can be deployed in both a single system (non-distributed) and in a distributed version of the system. While the FIGURES generally illustrate a single, co-located system architecture, the present invention is equally applicable to a distributed network that uses an optical router of the present invention to replace traditional routers such as those described in FIGS. 1, 2 and 3.

Figure 5:
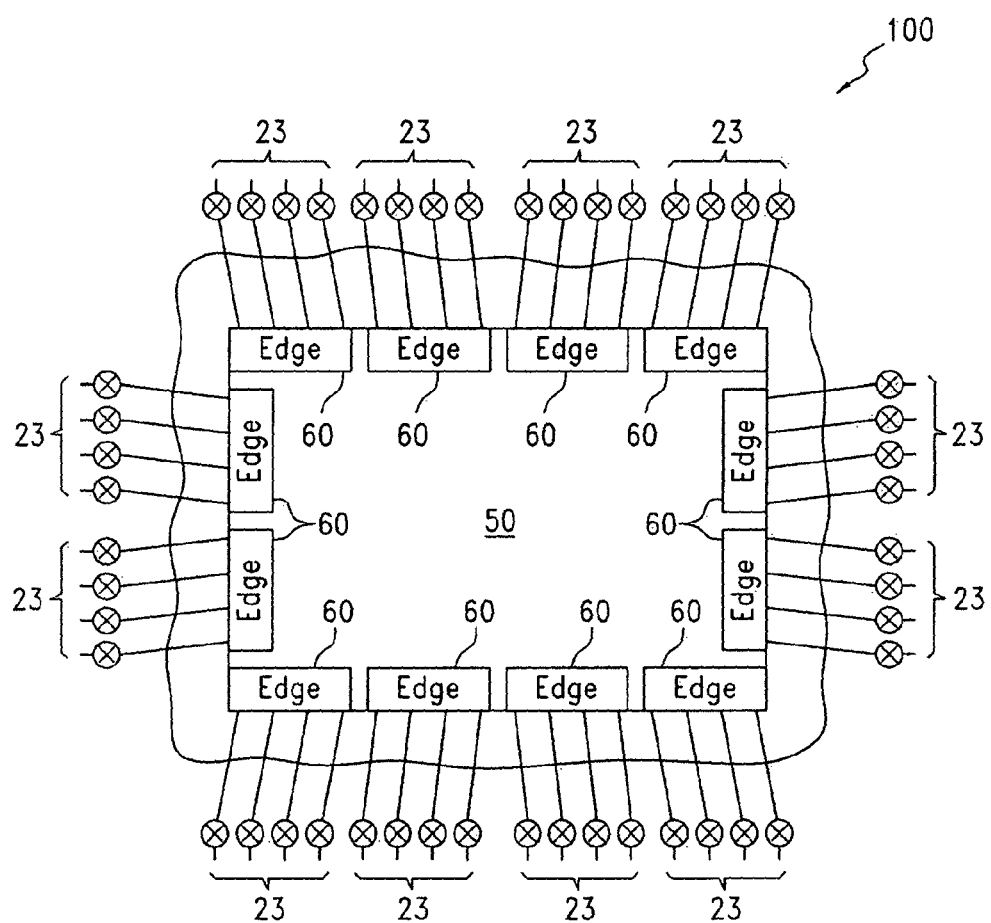
FIG. 5 illustrates an example network utilizing one embodiment of the non-blocking, optical transport system 50 according to the present invention.

FIG. 5 illustrates another example network 31 according to one embodiment of the present invention that can replace the optical cross-connect mesh 27 of FIG. 3 with a single, non-blocking, optical core node transport system 50 (i.e., optical router 50) that provides very fast, short term, μλ switching. As shown, in FIG. 5, the optical transport core 50 is surrounded with a "shell" of edge aggregation routers 60 (also referred to herein as "edge units" 60) so that data from any one edge unit 60 has access to any of its peer edge unit 60 without restriction. Essentially, each aggregation unit 60 has full dynamic bandwidth access to any other aggregation edge unit 60 surrounding the optical core. Moreover, each port (not shown) at each edge unit 60 has full access to every other port of optical transport core 50. This port-to-port architecture can substantially increase the flexibility of the present invention over prior art systems.

The inter-machine trunks associated with the optical cross-connect mesh 27 of FIG. 3 have been eliminated due to the present invention's ability to accommodate all of the total edge unit 60 capacity through a single optical core node router 50. The non-blocking nature of the present invention and its ability to rapidly configure any desirable connectivity between aggregation edge units 60 essentially eliminates (or at least reduces) the extremes of congestion and under-utilization of hard-wired optical cross-connect networks 27 of FIG. 3. Thus, the architecture of the present invention allows for a "port-rich" (i.e., having many ports) environment (such as a cross-connect mesh) within the optical core node 50 while allowing for routing capability (such as a mesh of routers) within the optical core node 50. Essentially, the optical core node 50 of the present invention is a plurality of routers (within each edge unit 60) having large connectivity (by virtue of the dense wave division multiplexing fiber or an equivalent) between each of the individual routers and the optical switch fabric 30 (to allow non-blocking data transport between ports of all the edge units 60).

Figure 6:
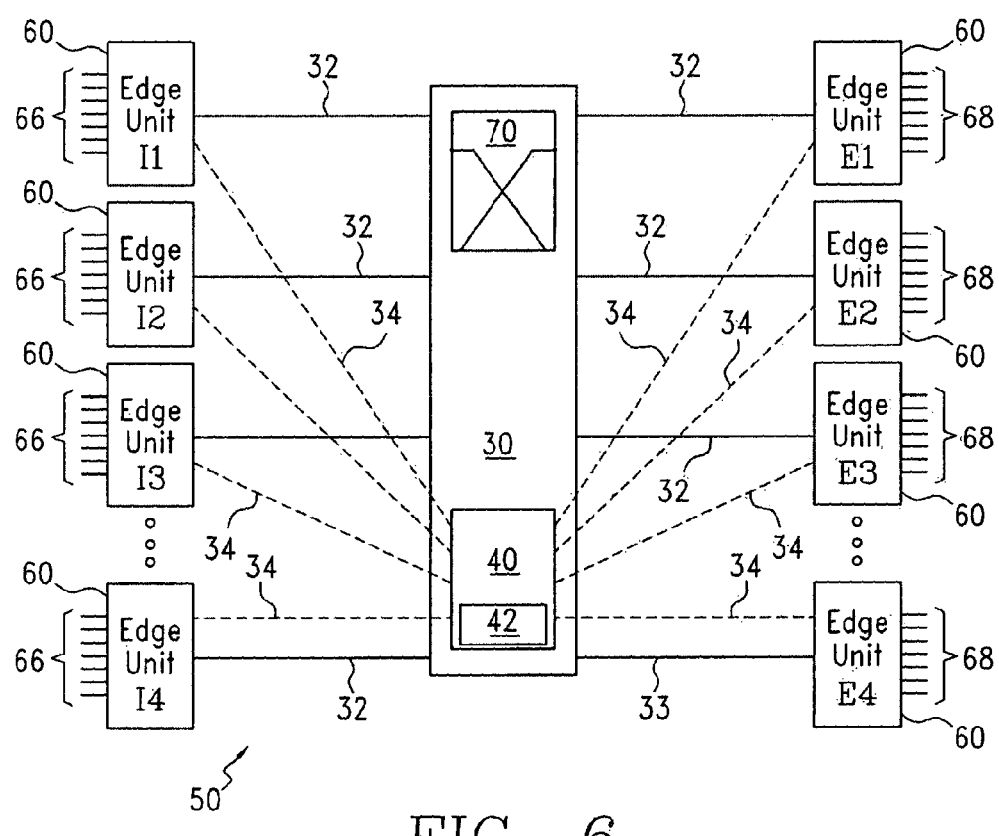
FIG. 6 shows one embodiment of the optical core node of the present invention.

FIG. 6 shows one embodiment of the optical core node 50 (or optical router 50) of the present invention. The optical core node 50 contains a switch fabric 30 (or optical switch core 30) and a core controller 40 that manages the routing through the optical switch fabric 30. As shown, each of a plurality of edge units 60 are linked to the optical switch fabric 30 via a plurality of μλ links 32, while also linked to the core controller 40 via a plurality of control links 34. The μλ links 32 are used to transport optical data from an edge unit 60 on the ingress side, through the optical switch fabric 30 to another edge unit 60 on the egress side. The control links 34 are used to convey control and scheduling information to and from the edge units 60 to allow for non-blocking routing of lambdas through the optical switch fabric 30. It should be understood that the μλ links 32 and the control links 34 can both comprise WDM fibers or ribbon. It should be further understood that the control links 34 and μλ links 32 can either comprise separate physical fibers/links or can combine a single physical fiber/link for both the control and data paths. In this manner, the optical switch core 30 is interconnected a plurality of edge units 60 that interface between the data links 20 and the optical switch core 30.

The optical core node 50 of the present invention works to optimize dynamic bandwidth management to provide maximum throughput with minimum data loss due to congestion or contention within the optical core of the switch fabric. This is accomplished in part using a TWDM wave slot switching scheme, as will be discussed below. The optical core node 50 can maintain a high degree of fairness for various qualities of service among the data flows that require switching from the ingress to the egress ports of the optical core node 50. Changes in bandwidth availability and requirements are managed by the core controller 40 using JIT switching so that the data links 20 to and from the switch fabric 30 itself can approach one Erlang without TDM or packet data loss. The optical core node 50 of the present invention supports many different types of data switching and routing that include ATM cells, IP packets, TDM Circuit switched data, and optical data known as "waves". In order to switch these varying types of data in the most equitable fashion possible, the optical router 50 of the present invention can include a defined quality of service data handling regimen (discussed in greater detail in conjunction with FIG. 12).

The present invention includes both a single system and a distributed system architecture. The single system, non-distributed (co-located) embodiment will be described herein. The fully distributed embodiment is designed to replace a large distributed network of individual routers that are poorly utilized due to capacity that is "tied up" in order to interconnect among themselves. The single system embodiment can replace a co-located cluster of smaller classical routers where they have been interconnected in a similarly inefficient fashion as the distributed network to gain added capacity, greater than any single router could provide. Thus, the optical core node 50 architecture can collapse a multitude of interconnected routers into a single infrastructure that is serviced by a non-blocking core switch fabric 30 with the characteristic that it can support virtually 100% of the interconnect bandwidth between the edge and core functions of the optical core node 50.

FIG. 6 shows one embodiment of the present invention including a combination of edge routers with a TWDM optical core matrix (fabric). The optical core node 50 of FIG. 6 includes a plurality of edge units 60 connected to a switch fabric 30 that is managed by core controller 40. The switch fabric 30 provides non-blocking connectivity between each ingress port 66 and each egress port 68 contained within the edge units 60. It should be noted that edge units 60 can be built as a single physical edge unit that includes both the ingress (input) and egress (output) functionality. Each edge unit 60 can contain multiple ingress ports 66 (e.g., contained within one or more port cards) and egress ports 68 (contained within one or more port cards), respectively, that can connect to a range of other optical network elements, such as smaller switches, routers, cross-connects, and/or transmission equipment that may require consolidation of large amounts of optical data. Additionally, optical switch fabric 30 can comprise a single optical switch fabric, or alternatively, can comprise a stack of switch fabrics or a multiple plane switch fabric. In one embodiment, the ingress side of edge unit 60 will contain the control and $\mu\lambda$ transmission functionality (in conjunction with core controller 40), while the egress side of edge unit 60 can, in one embodiment, essentially just function as a receptacle with little or no control functionality, perhaps other than with some timing control functionality (via software, hardware or firmware) due to the time domain multiplexing aspects of the present invention.

The network ports 66, 68 of the present invention can support high bandwidth IP traffic and/or TDM traffic (e.g., 10 Gbps and above). Each ingress edge unit collects the incoming optical data from the interface ports 66 into egress edge unit port 68 addressable $\mu\lambda$ for transmission over the $\mu\lambda$ links 32 to the core switch fabric 30, as illustrated in FIG. 6. A $\mu\lambda$ is a collection of data (e.g., IP packets and/or TDM (circuit switched) traffic) that can be targeted for a particular egress edge unit port 68. The size of a $\mu\lambda$ (i.e., its number of bytes) is configured throughout the optical core node 50 for optimum data transport and switching efficiency in the optical core node 50. The edge units 60 and optical core node 50 are scalable as the system grows in capacity.

As shown in FIG. 6, the present invention partitions the entire interface data capacity into a number of edge units 60 in order that the core controller 40 can simultaneously manage these edge units (via the control links 34) and the optical core switch fabric 30 properly. The data capacity of each edge unit 60 is set by the bandwidth of the one or more $\mu\lambda$ links 32 between the edge unit 60 and the optical core fabric 30 over which the $\mu\lambda$s are exchanged between edge units 60. The edge units 60 can be co-located with optical switch fabric 30 in the non-distributed version, while the distributed version of the optical core node 50 allows separation of the edge units from the optical switch fabric 30 by significant distances (e.g., several thousand miles).

In operation, an edge unit 60 will receive and process optical data (based on information from the core controller) and then send the data through the optical switch fabric 30 through optical switch 70. Core controller 40 coordinates bandwidth demand and priority of connectivity between ingress and egress ports of all edge units 60 for transmission through the switch fabric 30. Core controller 40 can interrogate the edge units 60 via control links 34 and issue a "coordinated connection pattern" (or a JIT schedule pattern) via these control links 34 as determined by a core scheduler 42 contained within core controller 40. This process is managed by the core scheduler 42 utilizing a hierarchy of schedulers in the edge units 60 (as will be described more fully herein) that can create and maintain both short and long-term data flows consistent with the demands of each edge unit 60. As such, the architecture of the optical core node 50 of the present invention can include a scheduler hierarchy designed to scale as bandwidth capacities grow (or shrink). Since the core switch fabric 30 is a non-blocking matrix, the core scheduler 42 is only required to resolve a "many-to-one" transport problem for each output port to obtain non-blocking transport through the optical switch fabric 30 to the destination port. In other words, the core scheduler does not have to avoid congestion within the core switch fabric 30 itself due to the non-blocking nature of the switch fabric 30.

As the processing speed of these various schedulers are currently (though not necessarily in the future) bounded by the limits of electronic circuits, the present invention can be designed to process incoming data at each edge unit 60 and time domain multiplex this incoming optical data into short cycle, small granularity data flows or "$\mu\lambda$s". These $\mu\lambda$s are switched within the switch fabric 30 as dictated by the scheduling pattern developed by the core scheduler 42 on a periodic basis. The $\mu\lambda$ data flows that are established by the core scheduler 42 between input/output ports are handled by time-wave division multiplexing (TWDM) utilizing wave slots to transport blocks of data through the core optical switch fabric 30.

Figure 7:
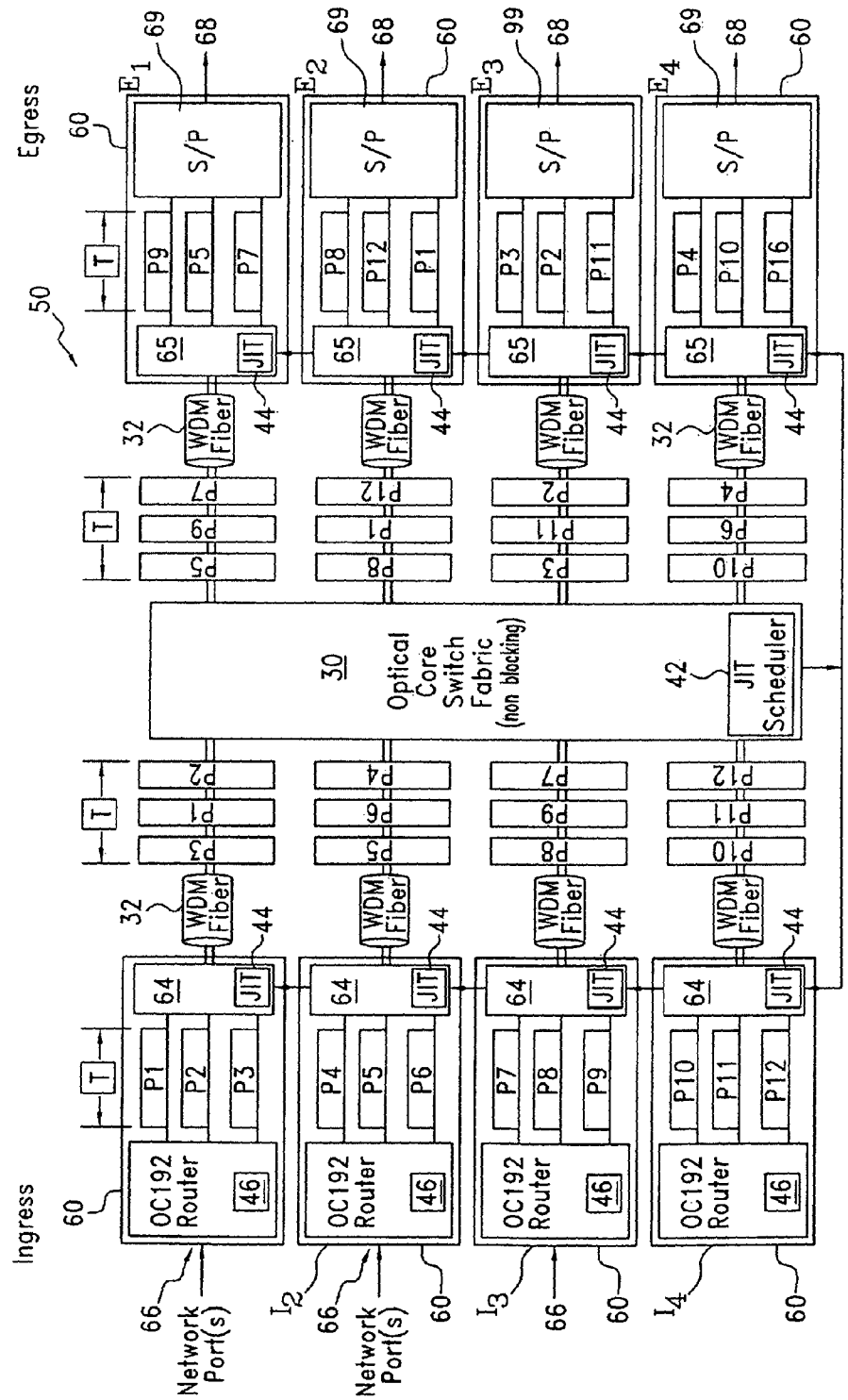
FIG. 7 shows one embodiment of an optical core node to illustrate an exemplary TWDM wave slot transport scheme as provided by one embodiment of the present invention.

FIG. 7 shows one embodiment of the optical core node 50 to illustrates an exemplary TWDM wave slot transport scheme as provided by the present invention. The embodiment of FIG. 7 illustrates a four edge unit 60 configuration where each edge unit 60 contains one port and each port has three "subflows" per port 66. It should be noted that the one port per edge unit configuration of FIG. 7 is given by way of example to illustrate the TWDM wave slot scheme accomplished according to one embodiment of the present invention. Each edge unit 60, however, can have many ports, with each port capable of creating more than three subflows.

In FIG. 7, subflows P1, P2 and P3 are associated with edge unit 60 labeled I1, subflows P4, P5 and P6 are associated with edge unit 60 labeled I2, subflows P7, P8, P9 are associated with edge unit 60 labeled I3 and subflows P10, P11 and P12 are associated with edge unit 60 labeled I4. A subflow represents some portion of the incoming data, in capacity terms, segregated into a smaller granularity dataflow. The size of subflows can be configured to optimize switching through optical switch fabric 30 and maintain quality of service requirements. Typically, each subflow will contain data destined for the same egress port 68.

Referring now to FIG. 7, optical core node 50 contains optical switch fabric 30 having core scheduler 42 connected to edge unit schedulers 44 at both the ingress and egress sides of optical core node 50 via control links 34. Thus, FIG. 7 illustrates the hierarchy of just-in-time ("JIT") scheduling arranged between the core controller 40 and the edge units 60. It should be understood that this scheduling hierarchy could be accomplished in other embodiments, such as a single controller unit.

The scheduler hierarchy (through the core scheduler 42, the edge unit controller 44 and the port scheduler 46) develops a TWDM cycle (shown as "T") of multiple wave slots that is updated as bandwidth demands change between the input/output ports 66/68 of the edge units 60. The optical switch fabric 30 is designed to change connections (or "paths" through the switch) as each wave slot occurs within the TWDM cycle as set forth by the core scheduler 42. In one embodiment, the dense wave division multiplexing (DWDM) nature of the μλ fiber links 32 between the edge units and the optical switch fabric enables the optical core node 50 to scale to capacities up to and in excess of a petabit/second while maintaining the non-blocking data flow characteristic.

In developing a schedule for a TWDM cycle, the core controller 40 can collect data on a periodic basis (e.g., on the order of once per millisecond). This data is then used to calculate a schedule or pattern that affects each edge unit 60 for the next transmission (TWDM) cycle, T, (e.g., which can also be on the order of once per millisecond). The core scheduler 42 provides each ingress interface 62 (e.g., in the form of a port card), each ingress edge unit 60, the optical switch fabric 30, the egress edge unit 60 and the egress interface 69 the transmission schedule pattern in order to pass the accumulated data through the optical switch fabric 30 in the most equitable fashion. This is done in such a manner that contention is avoided in the optical switch fabric 30 while maintaining non-blocking access throughout the optical cross bar switch 70. In addition, data flow to all egress ports 68 is managed such that they do not experience congestion in the many-to-one-case (many ports to a single port).

Additionally, a regiment of quality of service handling can be implemented in the ingress port scheduler 46 as directed by core scheduler 42. Thus, to the extent there are quality of service differentiation in the arriving data, those can be scheduled at the ingress interface 69. This can be done after the core scheduler 42 has been informed by each ingress port scheduler 46 of each one's individual needs for immediate bandwidth access to the optical core switch 30. The core scheduler 42 can collect from each ingress port interface 62 (i.e. from port scheduler 46) the current state of demand for bandwidth and priority, the accumulation of all data types and the quantity of each that needs to be transmitted through optical switch fabric 30.

In the example of FIG. 7, each of the four edge units 60 can create up to three subflows per TWDM cycle. As shown in FIG. 7, at ingress edge unit 60 labeled I1, incoming data corresponding to the three subflows P1, P2 and P3 can arrive at ingress port 66. Edge unit 60 (I1) can segregate into subflows P1, P2 and P3 (at ingress interface 62) and covert the subflows into μλs. (i.e., can convert the serial subflow into a short duration parallel burst of data across several wavelengths) at TWDM converter 64. TWDM multiplexer 64 can combine the functionality of a serial to parallel processor (for wavelength multiplexing) with the scheduling function (for time domain multiplexing). TWDM converter converts the subflows into μλs and then sends out the μλs on the associated μλ link 32 based on the schedule received from core scheduler 42. Thus, TWDM multiplexer 64 both re-arranges the subflows in time and multiplexes them from serial to parallel bit streams (i.e., converts each subflow into small granularity parallel bursts).

In FIG. 7, the subflows P1-P3 have been rearranged in time (i.e., have been time domain multiplexed) so that P2 flows from ingress edge unit 60 labeled I1 across μλ link 32 to optical switch fabric 30, followed by subflow P1, followed by subflow P3. Likewise the other subflows, P4-P12, flow in time across μλ links 32 in the time order shown in FIG. 7. Under this schedule T, when the four subflows, one from each of the ingress edge units 60, arrive at optical switch fabric 30, none of them are destined for the identical egress edge unit 60. For example, the first four subflows arriving at optical switch fabric 30 for cycle T are P2 (from "I1"), P4 (from "I2"), P7 (from "I3") and P12 (from "I4"). P2 is intended for output port 68 at "E3", while P4 is intended for "E4", P7 is intended for "E1" and P12 is intended for "E2". Thus, each of the subflows P2, P4, P7, and P12 can be routed through the optical switch fabric 30 simultaneously without congestion or blocking. Likewise, during schedule T, the remaining subflows P are sent from ingress to egress edge in a similar non-blocking manner.

Thus, the incoming data flow arriving at a network port 66 is subdivided into a number of "subflows" representing some portion (in capacity terms) of the data flow-arriving at that port 66, where each subflow is destined for a particular output port 68 on the egress side of the optical core node 50. The sending of these combined subflows (as micro lambdas) according to a particular scheduling cycle is the "time domain multiplexing" aspect of the TWDM switching of the present invention. It should be noted that time domain multiplexing of micro lambdas can occur by rearranging subflows in temporal order before the subflows are converted into micro lambdas, by rearranging the micro lambdas themselves in temporal order or by rearranging both micro lambdas and subflows in temporal order. The time domain multiplexing is repeated every "T" cycle, as indicated in FIG. 7. Each of the subflows (e.g., P1, P2 and P3 for ingress edge unit 60 labeled "I1") has a position in time or wave slot within the T cycle during which that subflow is sent (as a μλ) through the optical switch fabric 30. Thus, for a single port, three subflow per port, a three wave slot TWDM cycle is required at a particular μλ link 32 (twelve wave slots are used in total, per cycle). Each of the wave slots can filled by a subflow's worth of data intended for a particular output port 68 at the egress side of the optical core node 50. It should be noted, that in addition to accommodating a subflow (in μλ format), each wave slot can include a guard band gap (discussed in conjunction with FIG. 14) to allow time for optical switch fabric 30 to change connection between consecutive μλs.

At the same time, each μλ link 32 can carry multiple μλs split across multiple wavelengths between the ingress side of an edge unit 60, through the optical switch fabric 30 to the egress side of an edge unit 60. This is the "wavelength division multiplexing" aspect of the TWDM switching of the present invention. Each μλ link 32 can be designed to carry the entire capacity of the optical data arriving in the input ports of its edge unit 60 to the optical switch core 30 and each optical data subflow can also be sized such that each μλ can carry a subflow's worth of data.

Non-blocking switching can occur as long as no two subflows intended for the same edge with 60 arrive at the optical switch fabric 30 at the same time. As shown in FIG. 7 at the output side of optical switch fabric 30, each of the four μλ links 32 carries three subflows intended for the egress edge unit 60 associated with that particular link 32. For example, the μλ link 32 coupled to egress edge unit 60 labeled E1 carries subflows P7, P9 and P5. P7 arrived at optical switch fabric 30 prior to P9, which arrived prior to P5. Upon arriving at the egress edge unit 60 labeled E1, the TWDM demultiplexer 65 de-multiplexes µλs P7, P9 and P5, both in the wavelength and time domains. Demultiplexer 65 can also convert the µλs from parallel to serial bit streams. The time demultiplexing is done by communication between the core scheduler 42 and the edge scheduler 44 upon receipt of the subflows at the egress edge unit 60. Thus, the core scheduler 42 (using data received from the TWDM schedulers 44 at both the ingress and egress sides, typically, in previous TWDM cycles) develops a scheduling cycle T that (1) prevents the arrival at the optical switch fabric 30 of two µλs going to the same destination port 68 at the same time and (2) that when each subflow arrives at the destination egress edge unit 60 that each subflow has a distinct space in time from every other subflow arriving at the same egress edge unit 60 during cycle T. The TWDM demultiplexer 65 at the egress edge unit 60 can rearrange the arriving µλs to allow each to go to an appropriate subflow within the destination port 68, if the edge units 60 are configured to accommodate more than one subflow per port. It should be noted that while the TWDM scheduling pattern of FIG. 7 was discussed in terms of a four edge unit, one port, three subflows per port architecture, the scheduling pattern is equally applicable to a four edge unit, three port, one subflow per port architecture (i.e., the scheduling, pattern would still require twelve wave slots in which to transport each of the subflows per TWDM cycle).

While the present invention has primarily been described as a data transport product in which data packets are carried in various forms, the present invention can support circuit switched (TDM) data (as well as other forms of data), and could be used to replace large SONET based transmission or switching equipment. In order to facilitate circuit switched data and guarantee bandwidth, delay, and delay variation, rigid timing requirements can be imposed on the router of the present invention. The patterned µλ transmission and switching scheme in the core optical fabric 30 facilitates these rigid timing requirements, while simplifying the multitude of real-time hardware tasks that must be scheduled at wire speed throughout the router.

Thus, the control links 34 can be used by the core controller 40 to provision the µλ schedule of when to send the wave slots of data across the µλ links 32 from an ingress port 66 to an egress port 68. The core controller 42 defines the time intervals of when to send data to the optical switch fabric 30 and when to receive data from the optical switch fabric and provides that information to the edge units 60 via the control links 34. The control links 34 are part of the "synchronization plane" of the present invention. The control links 34, thus, carry the timing information to synchronize the data routing through the optical core node 50 (to avoid congestion), and also bring back from each of the edge units 60 to the core controller 40 the information regarding the relative amount of data at each edge unit 60 (e.g., the amount of data arriving at the ingress side needing to go to each output port 68 on the egress side or the amount of data arriving at each output port 68 on the egress side). The core controller 40 can then provide the timing data to the edge units 60 that maximizes data flow throughput (depending on the quality of service requirements of the system) through the optical core node 50.

The router 50 can include redundant central control units (not shown) that can distribute the system time base to the ingress and egress edge units by way of the redundant control packet (fiber) links 34 connecting the switch core to each of these edge units (e.g., to each DWDM multiplexer and demultiplexer element). The router time-base can be derived from a variety of redundant, external sources. In one embodiment, the time-base or basic clock signal is 51.84 Mhz, the fundamental frequency of SONET transmission. At this frequency, SONET signals and tributaries can be recovered, as well as ordinary 64. Kbps DS0 voice transmission that is based on 8 Khz.

In this embodiment, the optical switch core can utilize the system time-base (51.84 Mhz) for all µλ and control packet transmissions to each edge unit. All of the µλ data between edge units and the optical switch core can be self-clocking and self-synchronizing. The edge unit will recover data, clock, and synchronization from the µλ data within the DWDM subsystems and together with the control link from the optical switch core generates a local master clock (51.84 Mhz) for all edge unit operations, including transmission of µλ data to the optical switch core.

The optical switch core further utilizes the control links 34 for communication with each edge unit for JIT scheduling and verification of synchronization. The return path of this link from the edge unit back to the optical switch core is also based on the system time-base as recovered by the edge unit. It is from this path back to the optical switch core that the router extracts the edge unit time-base and determines that all the edge units are remaining in synchronization with the system time-base. These control links are duplicated between the optical switch core and all edge units, and therefore no single point of failure can cause a system time-base failure that would interrupt proper transmission and switching of µλ data throughout the system.

Figure 8:
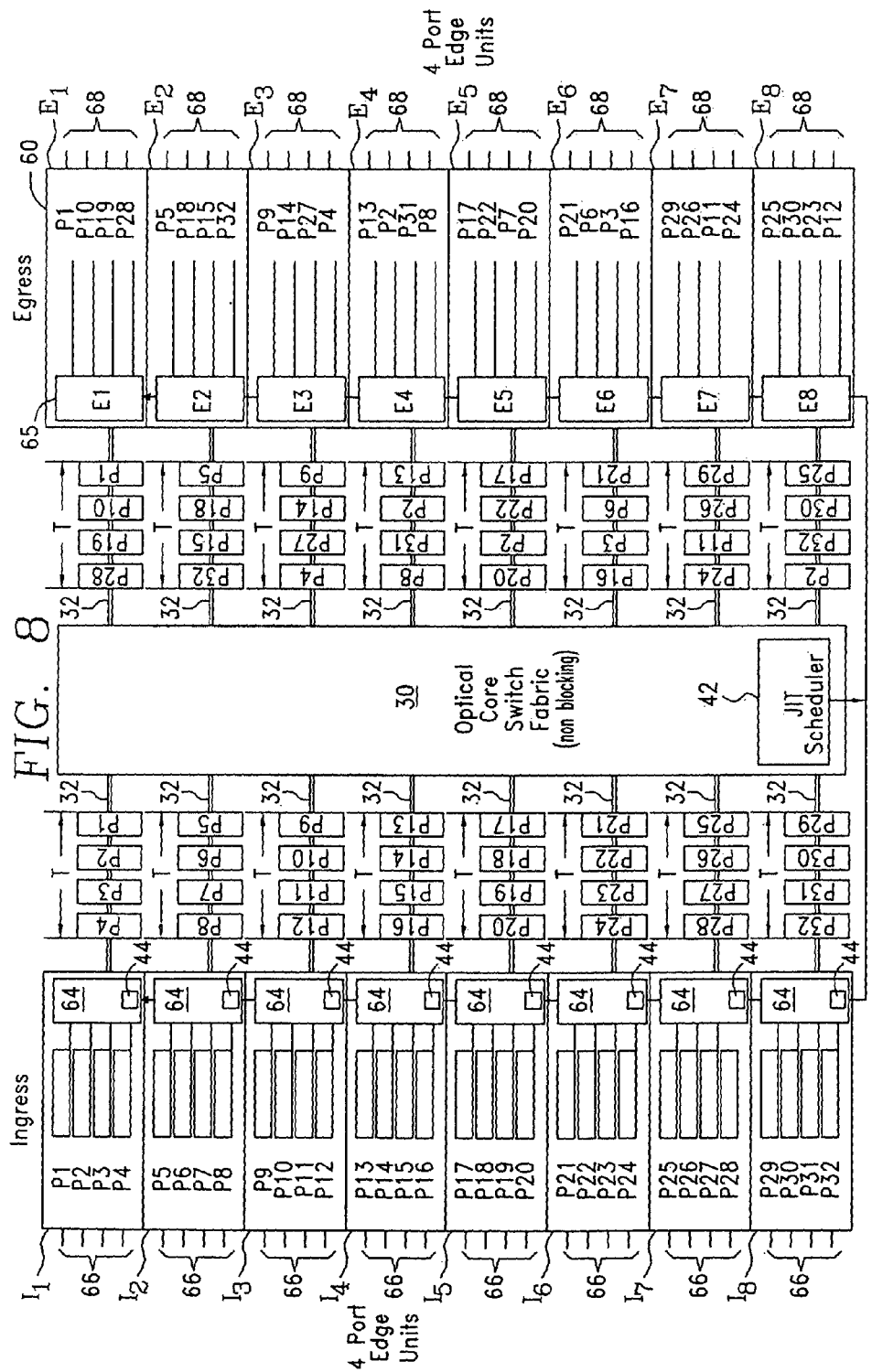
FIG. 8 shows an additional embodiment of an optical core node to further illustrate a TWDM wave slot transport scheme as provided by one embodiment of the present invention.

FIG. 8 shows another embodiment of the optical core node 50 to illustrate a TWDM wave slot transport scheme as provided by embodiments of the present invention. The embodiment of FIG. 8 illustrates an eight edge unit 60, four ports per edge unit and one subflow per port configuration. As shown in FIG. 8, subflows P1, P2, P3 and P4 are associated with edge unit 60 labeled I1; subflows P4, P5, P6 and P8 are associated with edge unit 60 labeled I2; subflows P9, P10, P11 and P12 are associated with edge unit 60 labeled I3, and so on through P32. Again, it should be understood that optical core node 50 can comprise any number of edge units 60, that each unit can include far more than one port, and each port can be configured to segregate data into any number of subflows.

Core scheduler 42 can receive information from each edge unit 60 regarding the arriving data at each edge unit 60 and create a schedule pattern for transmission of µλs to optical switch fabric 30. Each edge unit 60 can convert arriving data flows into subflows. TWDM converter 64 can then convert the subflows into µλs (i.e., a small granularity burst of data across several wavelengths) and transmit each λµ across a µλ link 32 to optical switch fabric 30 according to the schedule pattern received from core scheduler 42. Optical switch fabric 30 is designed to change connections to route each µλ to the appropriate egress edge unit. Thus, optical switch fabric 30 can change connections as each µλ occurs with the TWDM cycle as set forth by the core scheduler 42.

As shown in FIG. 8, the µλs are time multiplexed. That is, each µλ being transported on the same µλ link 32 is assigned a different wave slot in the TWDM cycle for transmission to optical switch fabric 32. With reference to FIG. 8, the first ingress edge unit (I1) receives subflows P1, P2, P3 and P4 from input ports 66, each destined for a particular output port 68. The subflows are converted into µλs for transmission through optical switch fabric 30 to the appropriate egress edge port 68. The µλ link 32 connected to the first ingress edge unit 60 has positions in time (i.e., wave slots) for each of the µλs during cycle T. Hence, for the four subflows arriving at edge unit I1, the corresponding µλ link 32 has four wave slots to transport the µλ from input port to output port. In the example shown in FIG. 8, P1 is destined for egress port 68 at egress edge unit 60 labeled E1, P2 is destined for egress port 68 at egress edge unit labeled E4, P3 is destined for egress port 68 at egress edge unit E6 and P4 is destined for egress port 68 at egress edge unit E3. Based on the distribution of load at the ingress edge units 60, a scheduling pattern can be developed for a TWDM cycle in accordance with which the subflows will be sent through optical switch fabric 30 in a non-blocking manner. In comparison to FIG. 7, the scheduling pattern of FIG. 8 is relatively more complex as core scheduler 42 must schedule 32μλs rather than 12μλs. However, so long as no two μλs destined for the same egress edge unit 60 arrive at the optical switch fabric 30 at the same time, blocking physically will not occur. Additionally scheduling patterns for even and uneven traffic distributions are discussed in conjunction with FIGS. 16-18.

Figure 9:
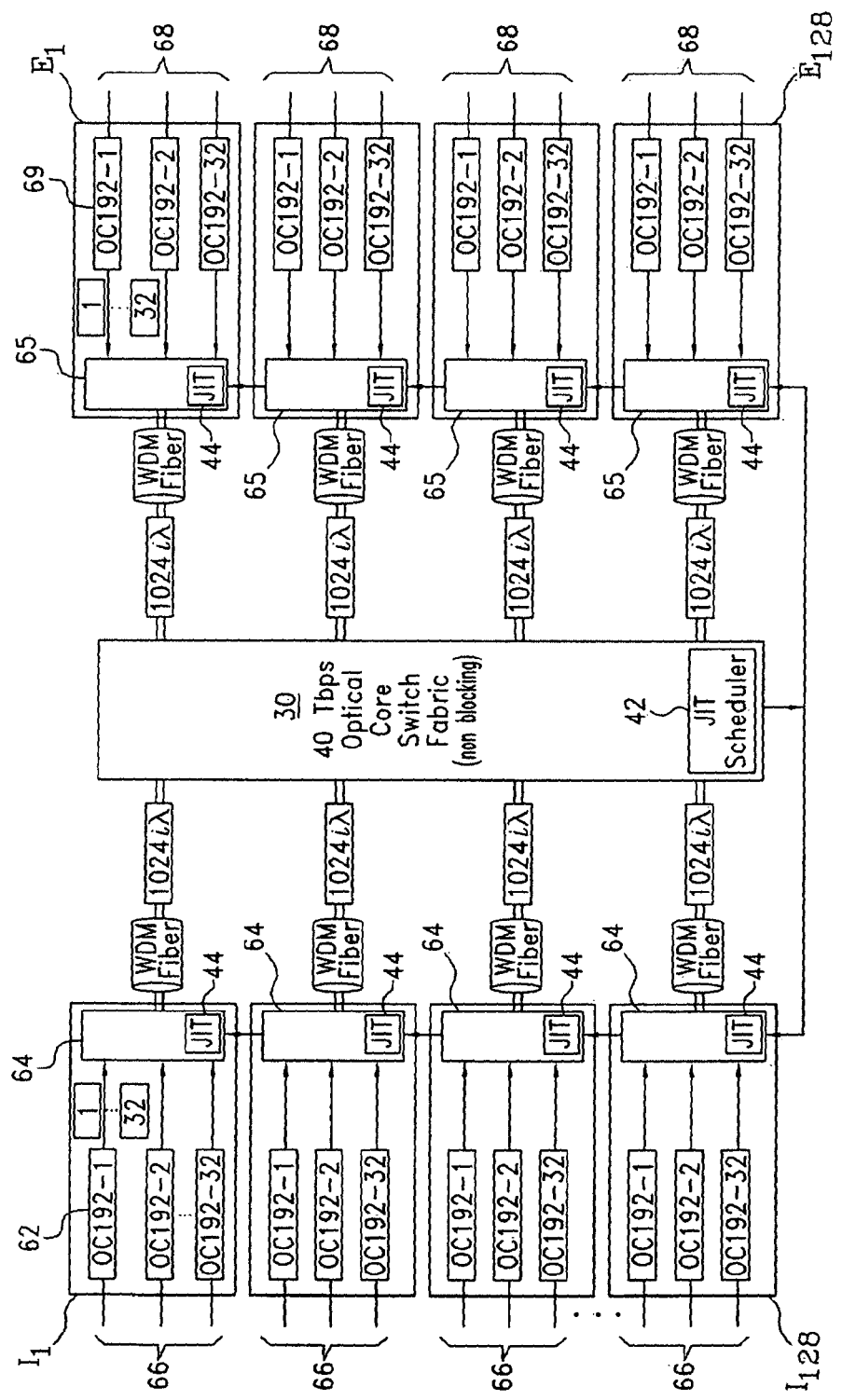
FIG. 9 illustrates an example 40 Tbps embodiment of an optical core node utilizing a TWDM transport scheme as provided by one embodiment of the present invention.

FIG. 9 shows a diagrammatic representation of a 40 Tbps embodiment of the router 50 of FIG. 7 with a connection granularity of OC-6 data rates. In this FIG. 9 embodiment, data arriving at each ingress port 66 can be received at an ingress interface 62. The ingress interface 62 can distribute the incoming data flow among several subflows, with each subflow containing data destined for the same egress port 68. For example, if the ingress interface 62 comprises an OC-192 router 62 (ingress interface 62), the incoming OC-192 data flow could be distributed among 32 OC-6 subflows. If, as illustrated in FIG. 9, there are 32 ingress ports 66 per edge unit 60, there could be up to 1024 subflows per edge unit 60 (32 OC-6 subflows for each of the 32 ports per edge unit 60). At each edge unit 60, multiplexer 64 can convert the serial subflows from multiple ports into μλs and can further time multiplex the μλs onto μλ link 32. In this embodiment, each μλ link 32 can carry the entire capacity of the incoming data flow per TWDM cycle of a particular edge unit 60 (i.e., can carry 1024μλs per cycle).

For example, in the FIG. 9 embodiment, each edge router can comprise 32 OC 192 interfaces capable of handling 10 Gbps of data. Consequently, each edge unit can handle 320 Gbps of data and the optical core node 50, with 128 ingress/egress edge units, can handle 40 Tbps of data. The data arriving at an OC 192 port can be subdivided into 32 subflows, each containing a "OC-6 worth" of data (approximately 311 Mbps). Thus, if each edge unit 60 includes thirty-two network ports 66, then 1024 subflows containing an "OC-6 worth" of data can be created at each edge unit 60.

Each edge unit 60 can then convert each OC-6 subflow into a μλ, yielding 1024μλs per edge unit 60, with each μλ carrying a subflows worth of data. The μλs can be time multiplexed into wave slots on the μλ links 32 and each μλ can then be independently switched through the optical switch core 30 to the appropriate output port 68 for which the data contained within that μλ is destined. Thus, within a TWDM cycle "T," the 1024μλs on any μλ link 32 can carry the entire 320 Gbps capacity of the associated edge unit 60. Moreover, there are essentially 1024 potential inputs traveling to 1024 potential destinations. This establishes the advantage of highly flexible connectivity between the ingress and egress sides of the optical core node 50.

At the egress side, each egress edge unit can receive the μλs routed to that edge unit 60 during the TWDM cycle. Accordingly, for the FIG. 9 embodiment, each edge unit can receive up to 1024μλs per TWDM cycle (i.e., can receive 32 subflows per port). The μλs can be demultiplexed in the time and wavelength domains at demultiplexer 65 to form up to 1024 subflows per TWDM cycle. The subflows can be routed to the appropriate egress edge interface 69 (i.e., the egress edge interface associated with the egress port 68 to which the particular subflows are destined).

In the embodiment of FIG. 9, each egress interface 69 can comprise an OC-192 router capable of creating an OC-192 data stream from the arriving OC-630 subflows. Each egress interface 69 can receive up to 32 OC-6 subflows per TWDM cycle, allowing each egress port 68 to connect to 32 separate ingress ports 66 per TWDM cycle (or alternatively, up to 32 subflows from a single input port 32 per JIT cycle or any combination of multiple subflows from multiple ports, up to 32 subflows per cycle). Since the JIT schedule can be updated every cycle, over a longer period of time, however, an egress port 68 can connect to far more than 32 ingress ports 66 (i.e., can receive subflows from additional ingress ports).

Synchronization of μλ transmission through optical core node 50 is managed by a hierarchy of schedulers. JIT scheduler 42 monitors each edge unit 60 and dynamically manages the flow of μλs to optical switch fabric 30 so that the μλs can be switched in a non-blocking fashion. JIT scheduler 42 collects data from each edge unit 60 on a periodic basis (once per TWDM cycle, for example). The data is used to calculate a schedule that affects each unit for the next TWDM cycle. JIT scheduler 42 provides a schedule pattern to each edge unit scheduler 44 for the ingress and egress edge units 60 and the optical switch 70. In one embodiment of the present invention, the schedule pattern is further propagated by the edge unit schedulers 44 to port schedulers (not shown) at each port ingress/egress interface for the corresponding edge unit. Ingress edge units 60 will form and time multiplex μλs according to the schedule pattern and optical switch 70 will dynamically route the μλs to the appropriate egress edge unit 60 according to the schedule pattern. Because no two μλs destined for the same egress edge unit 60 arrive at the optical switch 70 at the same time, contention physically can not occur. Each egress edge unit 60 can then route the arriving μλs to the appropriate egress ports 68 according to the schedule pattern.

FIG. 10A illustrates the division of incoming data into subflows. In the embodiment shown in FIG. 10A, each ingress port 66 is associated ingress interface 62 comprising an OC-192 router capable of receiving 10 Gbps of data from ingress port 66. The OC 192 edge router can route the incoming data to 32 port buffers 94 (i.e., can simultaneously generate 32 subflows), each of which can store an OC-6 worth of data and can contain data destined for the same egress port 68. In this manner, the arriving data stream can be segregated into 32 subflows of approximately 311 Mbps. This granularity gives each ingress interface port access to 32 egress port interfaces 69 (or to 32 subflows within egress port interfaces 69) in order to connect up to 32 data flows per TWDM cycle, increasing the overall flexibility of the present invention. If there is a heavier traffic demand for a particular egress port 68 (or subflow within a port), more than one buffer 94 can be assigned to that egress port (e.g., more than one subflow can be created for a particular egress port at an ingress port, per TWDM cycle). Because the JIT schedule can be updated every millisecond, and ingress port interface 62 can connect to far more than 32 egress ports over a longer period of time.

Each of the port buffers 94 can be sampled according the schedule established by core scheduler 42 and propagated to edge unit scheduler 44 and port scheduler 46. The data from each port buffer 94 (i.e., each subflow) can be converted into a μλ and can be transmitted to the optical core 30 over μλ links 32 according to the JIT schedule. A sample schedule is illustrated in FIG. 10B. It should be noted, however, that the order of sampling will change based on the JIT schedule.

The ingress interface 62 of FIG. 10A can represent one of many port cards at an ingress edge unit 60. If, for example, each ingress edge unit received 320 Gbps of data, there could be at least 32 ingress ports 66, each associated with OC 192 router (i.e., each ingress interface 62 can comprise an OC-192 router) capable of processing 10 Gbps of data. Each ingress interface 62 can further comprise 32 OC-6 input buffers 94 to form 32 subflows per ingress port 66, each containing an "OC-6 worth" of data. Each edge unit 60, therefore, could generate up to 1024 subflows per TWDM cycle.

As shown in FIG. 11A, on the egress side, each egress port 68 can be associated with a egress interface 69 (e.g., comprising an egress OC-192 router 69). µλs arriving at port card 69 on µλ links 32 are demultiplexed (the demtultiplexer is not shown) in the time and wavelength domains to create 32 subflows. The subflows can arrive over a JIT cycle in the example order illustrated in FIG. 11B and can be buffered at output buffers 102. Additionally the arriving µλs can be rearranged in time for transmission to output port 68. Alternatively, the subflows can be forwarded directly to the output port without buffering. If each edge unit 60 comprises 32 OC-192 routers 69 capable of receiving 32 subflows per TWDM cycle; each egress edge unit can receive up to 1024 subflows per TWDM cycle. Further more, each OC-192 router 69 can receive up to 32 of the 1024 subflows per TWDM cycle. Thus, each port 68 can connect with up to 32 ingress ports 62 per TWDM cycle and, over multiple TWDM cycles, each egress port 68 can connect with far more than 32 ingress ports 62.

Figure 12:
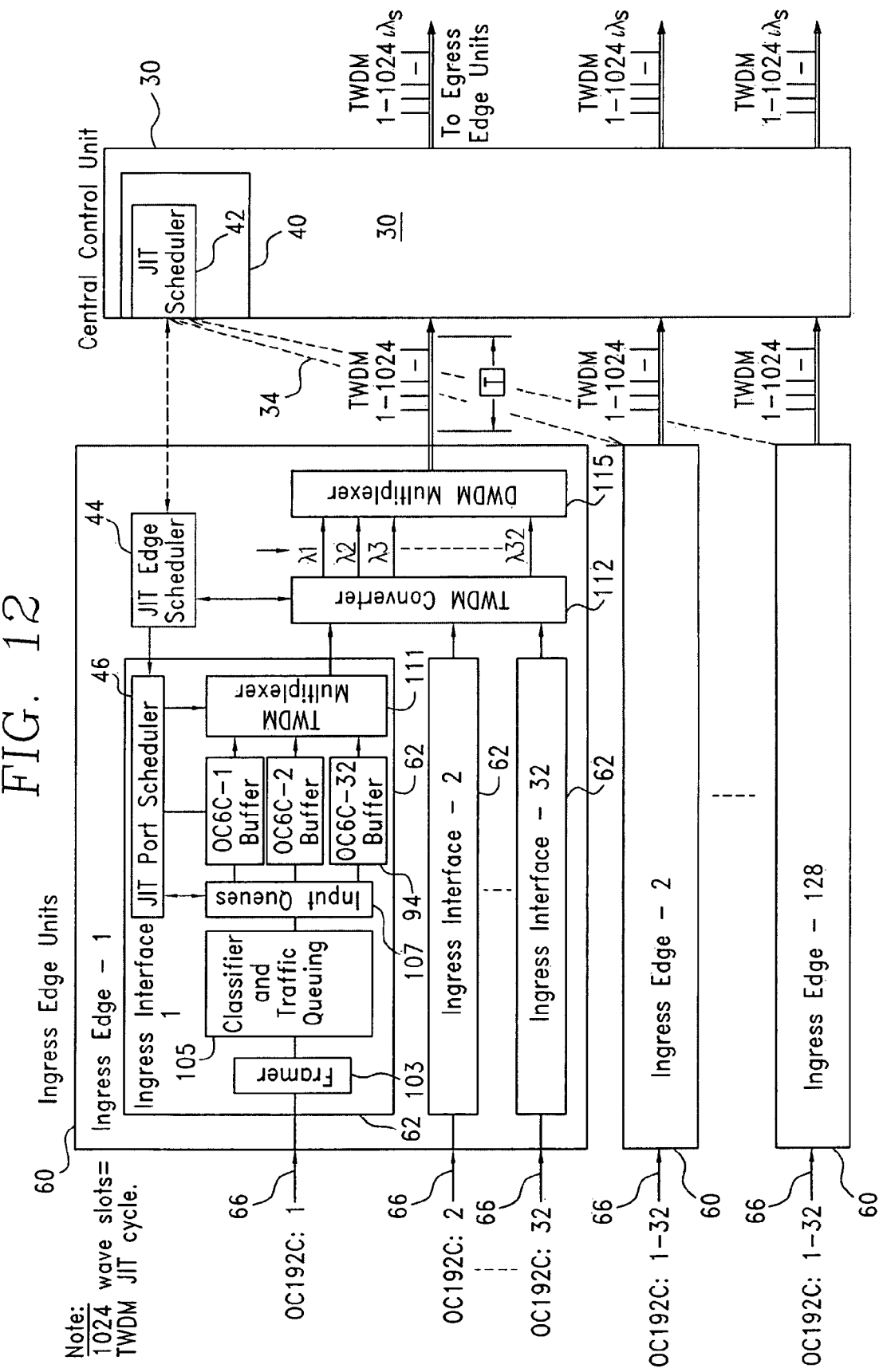
FIG. 12 illustrates the ingress portion and optical core for one embodiment of an optical core node according to the present invention.

FIG. 12 illustrates one embodiment of the ingress portion of an optical core node 50 according to the present invention. Optical core node 50 can include a switch fabric 30 and a core controller 40 that manages the routing of µλs through optical switch fabric 30. A plurality of edge units 60 are linked to the optical switch fabric 30 via a plurality of µλ links 32, while also linked to the core controller 40 via a plurality of control links 34. The core controller can include a JIT scheduler 42 to establish a schedule pattern for the transmission of µλs to optical switch fabric 30 and switching of µλs through optical switch fabric 30. The µλ links 32 are used to transport µλs from the ingress edge units to optical switch fabric 30 to an egress edge unit on the other side. It should be understood that µλ links 32 and the control links 34 can both comprise WDM fibers or ribbon and that the µλ links 32 and control links 34 can either comprise separate physical fibers/links or can be combined into a single physical fiber/link.

Each ingress edge unit 60 can receive data from a plurality of ingress ports 66. In the embodiment of FIG. 12, each ingress edge unit 60 can comprise 32 ingress ports 66, each capable of receiving 10 Gbps data (i.e., each edge unit can receive 320 Gbps, of data). In addition, each ingress port 66 can be associated with a ingress interface 62 comprising an OC-192 router that is capable of subdividing the incoming OC-192 data into 32 subflows, each subflow containing an "OC-6 worth" of data. Thus, each edge unit can produce up to 1024 subflows per TWDM cycle (i.e., 32 ports can each produce 32 subflows). Each subflow represents data destined for the same egress port 68 at an egress edge unit 60.

In one embodiment of the present invention, the incoming data stream at an edge unit is a SONET stream, a framer 103 can read the overhead information in the data stream to determine the data contained in the stream. The overhead information can be used to determine where data packets begin and end in the stream so that the data packets can be stripped out of the stream. Additionally, a classifier 105 can classify each incoming data packet based on the packet type (e.g., IP packet, TDM, etc.) The incoming data can then be placed in QoS queues 107 based on the quality of service required for that data. In order to switch data having the different QoS requirements in the most equitable fashion possible, embodiments of the optical router 50 of the present invention can include a defined quality of service data handling regimen, an example of which follows.

Data that can be handled with the greatest degree of preferential treatment is that associated with constant bandwidth services such as TDM or "wave" types of data (e.g., circuit switched time domain multiplexed (TDM) data). This type of data is essentially circuit switched data for which bandwidth is arranged and guaranteed under all circumstances to be able to pass through the switch without contention. In this regimen, statistical multiplexing is generally not allowed.

Data that can be handled with the next lower degree of preferential treatment is that associated with connection oriented, high qualities of service categories such as ATM cells or IP packets associated with the MPLS protocol (e.g., connection-oriented packet data). This type of data requires that connections be reserved for data flows in advance of data transmission. These connections are network wide and require that switches be configured to honor these data flows for both priority and bandwidth. In this connection-oriented packet data regime, some statistical multiplexing is generally allowed.

Data that can be handled with the next lower degree of preferential treatment is that associated with non-connection oriented, high qualities of service categories such as DiffServ IP packet data (i.e., non-connection oriented packet data). Again, for this type of non-connection oriented packet data, some statistical multiplexing is generally allowed. Also, this type of data does not require that connections be reserved in advance for data flows. Therefore, either of the two preceding types of data listed clearly takes precedence over non-connection oriented data such as DiffServ.

Finally, data having the least priority for switching is that associated with "best effort" data. This type of data has no quality of service requirements and is switched or routed when there is absolutely no higher priority data present. Clearly, no reservation of bandwidth is required for switching this type of data (though reservation bandwidth could be allocated). Data in this best effort category can be dropped after some maximum time limit has been reached if it had not been transmitted. Thus, based on the QoS requirements of the incoming data, the traffic manager can forward higher QoS data to the queues 107 and discard excess, lower QoS data if necessary.

From the data forwarded to queues 107, a port scheduler 46 can determine how much data for each QoS level is destined for a particular egress port 68. Edge scheduler 44 can collect this information from each port scheduler 46 in the edge unit and forward the information to core scheduler 42. Thus, core scheduler 42, through edge schedulers 44, can, in one embodiment of the present invention, receive the bandwidth requirements from each port within optical core node 42 and develop a schedule pattern for the optical core node. This schedule pattern can be propagated back to the port schedulers 46 via the edge schedulers 44.

Based on the schedule pattern received from core scheduler 42, port scheduler 46 directs the input queues to forward data to input buffers 94. In the case of a 320 Gbps ingress edge unit with 32 ports (each port receiving 10 Gbps), each input buffer 94 can buffer and "OC-6 worth" of data (e.g., approximately 311 Mbps). In this manner 32 subflows, each containing an "OC-6 worth" of data can be formed.

In one embodiment of the present invention, each input buffer 94 can correspond to a different egress port, such that all data contained within that buffer during a particular cycle will be destined for the corresponding egress port 68. It should be noted, however, as bandwidth demands change, the number of input buffers 94 associated with a particular egress port 68 can change. Furthermore, each input buffer 94 can be associated with a different egress port 68 during different TWDM cycles. Thus, over time, a particular input port 66 can communicate with far more than 32 output ports 68. It should be noted that each subflow can contain an assortment of different QoS data. This might be desirable, for example if there is not enough high QoS data destined for a particular egress port 68 to fill an entire OC-6 subflow, but there is additional lower QoS data bound for the same egress port 68. In such a case, the higher QoS data and lower QoS data can be contained within the same OC-6 subflow, thereby increasing utilization efficiency.

Port scheduler 46 can direct each of the buffers 94 at the associated port interface 62 to transmit the subflows to TWDM Multiplexer 111 according to the schedule pattern received from core scheduler 42. TWDM Multiplexer can then rearrange the subflows in temporal order for transmission to TWDM converter 112. In other words, TWDM multiplexer can time multiplex the subflows received from the 32 input buffers 94 for transmission to TWDM converter 112.

At TWDM converter 112, each subflow received from each port interface 62 at an edge unit 60 is converted into a $\mu\lambda$ by distributing each subflow across multiple wavelengths. Thus, each $\mu\lambda$ contains a subflow's worth of data, distributed as a short duration simultaneous data burst across several wavelengths. TWDM converter 112 also interleaves the $\mu\lambda$s according to the schedule pattern received from edge scheduler 44. Thus, TWDM converter 112 transmits each $\mu\lambda$ in a particular wave slot (time slot) during a TWDM cycle, according to the schedule pattern. In this manner, the $\mu\lambda$s are time multiplexed (e.g., are interleaved in the time domain for transmission across the same channels). In the FIG. 12 embodiment, TWDM converter 112 can receive 1024 subflows per TWDM cycle, convert each of the subflows to a $\mu\lambda$ across 32 wavelengths, and transmit the 1024$\mu\lambda$s in a particular temporal order, as dictated by core scheduler 42, to DWDM multiplexer 115. DWDM multiplexer 115 multiplexes each of the $\mu\lambda$s in the wavelength domain for transmission to optical core 30 via $\mu\lambda$ links 32. Thus, each subflow is multiplexed in both the time and wavelength domains.

FIG. 12 illustrates an embodiment of ingress edge unit 60 in which the functionality of multiplexer 64 of FIG. 7 is distributed between a port multiplexer 111, TWDM converter 112 and DWDM multiplexer 115. It should be understood, however, that this represents only one embodiment of the present invention and the functionality of multiplexer 64 of FIG. 7 can be otherwise distributed. For example, port multiplexer 111, in another embodiment of the present invention, can convert each subflow to a $\mu\lambda$ and transmit the $\mu\lambda$s TWDM converter 112 according to the schedule dictated by core scheduler 42 (received from port scheduler 46). TWDM multiplexer 111 can then time multiplex the $\mu\lambda$s arriving from each port interface 62 onto the $\mu\lambda$ link 32 according to the JIT schedule (received from edge scheduler 44). Furthermore, the embodiment of FIG. 12 is provided by way of example only an other embodiments of edge units can be configured to create and TWDM multiplex $\mu\lambda$s.

Figure 13:
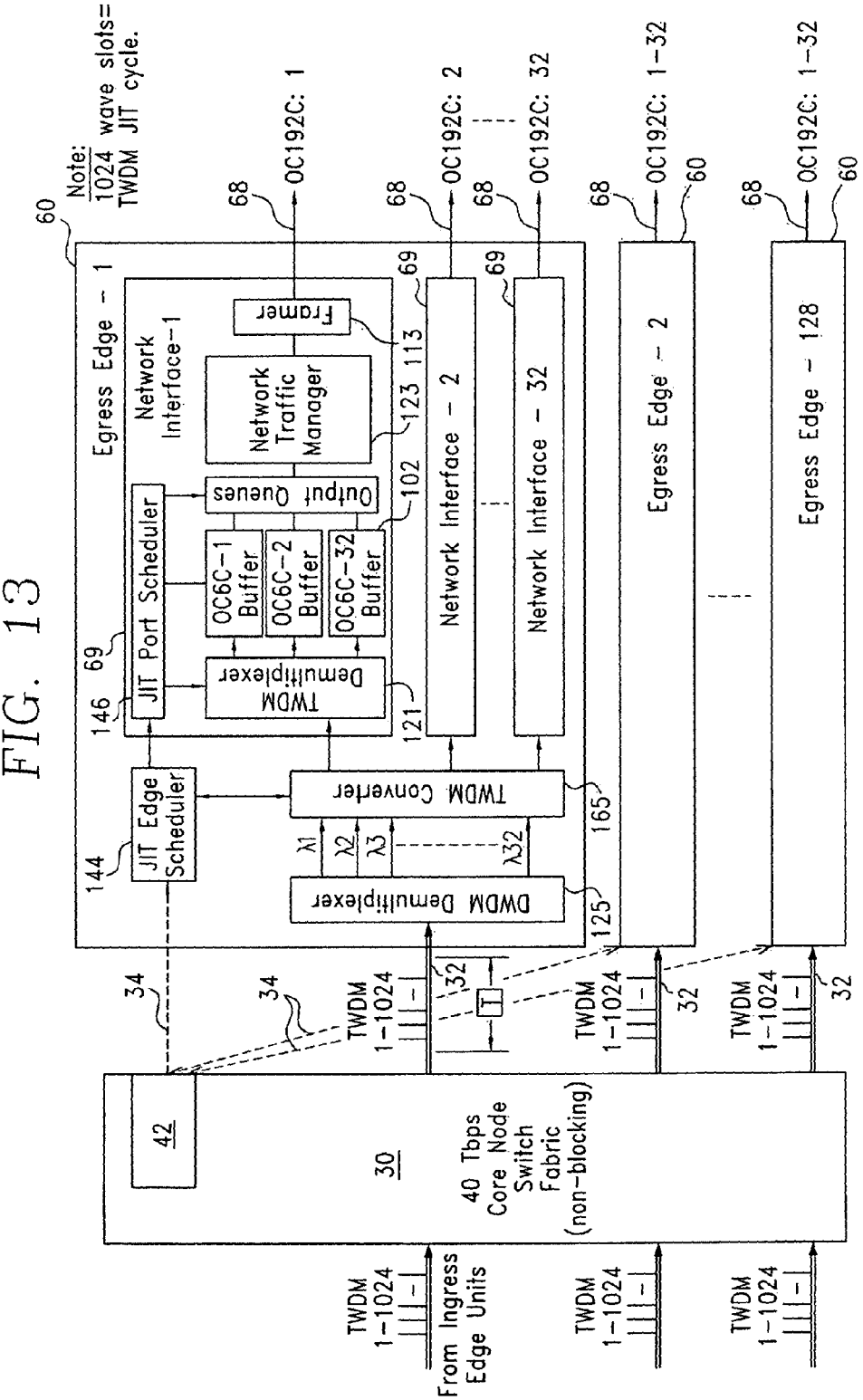
FIG. 13 illustrates the egress portion and optical core for one embodiment of an optical core node according to the present invention.

FIG. 13 illustrates one embodiment of the egress portion of an optical core node 50 of the present invention. Optical core node 50 can include switch fabric 30 and a core controller 40 that manages the switching of $\mu\lambda$s through optical switch fabric 30. The core controller 40 can include JIT scheduler 42 to establish a schedule pattern for the transmission of $\mu\lambda$s through optical switch fabric 30. A plurality of edge units 60 are linked to the optical switch fabric 30 via a plurality of $\mu\lambda$ links 32 while also linked to core controller 40 via a plurality of control links 34. The $\mu\lambda$ links 32 are used to transport $\mu\lambda$s from optical switch fabric 30 to the edge units 60.

Each egress edge unit 60 can receive data from optical switch fabric 30 and can transmit data to a variety of other optical networking components on network 100 via egress ports 68. In the embodiment of FIG. 13, each egress edge unit can comprise 32 egress ports 68, each capable of transmitting 10 Gbps of OC-192 data (i.e., each edge unit 60 can transmits 320 Gbps of data). Each egress port 68 can be associated with an egress interface 69 capable of receiving up to thirty-two $\mu\lambda$s, each carrying an "OC-6 worth" of data, per TWDM cycle, demultiplexing the $\mu\lambda$s and concatenating the data from the received $\mu\lambda$s into an outgoing OC-192 data stream.

In operation, DWDM receiver 125 receives $\mu\lambda$s from switch fabric 30 via $\mu\lambda$ link 32. Typically, each $\mu\lambda$ link 32 carries only $\mu\lambda$s destined for a particular edge unit 60. At the recipient edge unit, DWDM receiver 125 de-multiplexes each received $\mu\lambda$ and, for each $\mu\lambda$, generates a separate optical stream for each wavelength that was present in the $\mu\lambda$. These de-multiplexed optical signals are passed to egress TWDM converter 165 for further processing.

TWDM converter 165, as illustrated in FIG. 13, receives the $\mu\lambda$s as a set of de-multiplexed DWDM wavelengths presented as a parallel set of optical streams. For example, in the embodiment illustrated in FIG. 13, TWDM converter 165 receives each $\mu\lambda$ as 32 wavelength parallel burst. Upon receipt of a $\mu\lambda$, TWDM converter 165 can convert the $\mu\lambda$ from a parallel to a serial subflow and can direct the subflow to the appropriate egress interface 69 according to the schedule received from edge scheduler 44.

At each egress interface 69, TWDM demultiplexer 121 can demultiplex arriving $\mu\lambda$s (as subflows from TWDM converter 165) in the time domain and route the $\mu\lambda$s to output buffers 102 in a particular order dictated by egress port scheduler 46. In one embodiment of the present invention, each output buffer 102 can buffer approximately 311 Mbps of data, or an "OC-6 worth" of data. Because each subflow created at the ingress edge units 60 also contains and "OC-6 worth" of data, each output buffer 102 can essentially buffer a subflow per TWDM cycle. Furthermore, because scheduling is propagated throughout core node 50 from core scheduler 42 down to the ingress port scheduler 46 and egress port scheduler 46, data can be routed not only from port to port, but also from subflow to subflow (i.e., from a particular input buffer 94 to a particular output buffer 102).

Output buffers 102 can then forward data to output queues 117 based on the schedule received from egress port scheduler 146. Further based on the schedule received from egress port scheduler 146, output queues can transmit the subflows out egress port 68 as an OC-192 data stream. However, because the output stream is made up of what is essentially a series of OC-6 data streams, network traffic manager 123 can perform burst smoothing to create a more continuous OC-192 stream. Additionally, as egress interface 69 transmits the OC-192 stream through egress port 68, framer 113 can add overhead information (e.g., for a SONET system), including overhead bytes used to delineate specific payloads within the stream.

FIG. 13 illustrates an embodiment of an egress edge unit in which the functionality of demultiplexer 65 of FIG. 7 is distributed among DWDM receiver 125, TWDM demultiplexer 121 and TWDM converter 165. However, as with the ingress edge unit 60 of FIG. 12, other configurations of egress edge unit 60 can be used. For example, egress edge unit 60 can comprise a demultiplexer 65, a plurality of egress interfaces 69 (each associated with a particular egress port 68) and an edge scheduler 144. When micro lambdas arrive at egress edge unit 60, demultiplexer 65 can wavelength division demultiplex each micro lambdas and time domain demultiplex each micro lambda according to the scheduling pattern received from core scheduler 42 (via edge scheduler 144). Demultiplexer 65 can also convert the micro lambdas into corresponding subflow (i.e., can convert the parallel bit streams to serial bit streams) and forward the subflows to the appropriate egress interface according to the scheduling pattern for transmission out the associated egress port 68. In this embodiment of egress edge unit 60, egress edge unit 60 can be a "dumb" terminal, only requiring the processing capabilities necessary to time and wavelength demultiplex the micro lambdas, convert the micro lambdas to subflows and forward the subflows to the appropriate egress interface. In other words, the egress edge unit 60 need only process the incoming micro lambdas according to a set of instructions (i.e., a scheduling pattern) that is developed at core scheduler 42. This can substantially reduce the processing requirements and, consequently, size of the egress edge unit 60.

The previous discussion described example embodiments of ingress edge units and egress edge units. As described, each ingress edge unit is capable of receiving optical data, segregating the data into subflows, converting the subflows into $\mu\lambda$s, and time domain multiplexing the $\mu\lambda$s onto a $\mu\lambda$ link for transport to an optical switch 70. Optical switch 70 can change connections according to JIT schedule received from core scheduler 42 to route $\mu\lambda$s to the appropriate egress edge unit. Each egress edge unit can receive the $\mu\lambda$s routed to that edge unit, time demultiplex the $\mu\lambda$s and convert the $\mu\lambda$s into serial subflows. Finally, each egress edge unit can concatenate the subflows into a continuous outgoing data stream.

Figure 14:
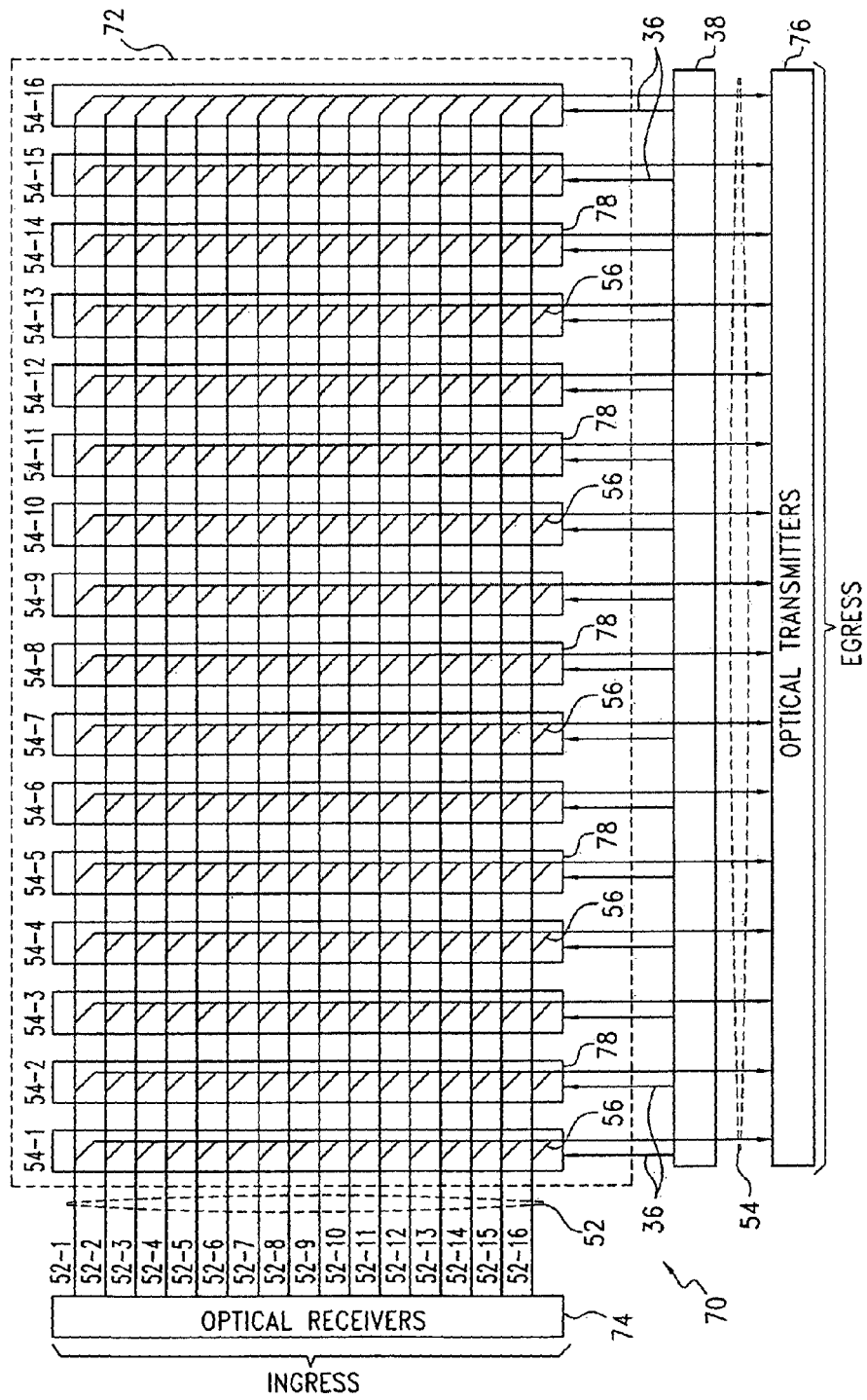
FIG. 14 is a more detailed view of one embodiment of an optical switch fabric.

FIG. 14 shows an embodiment of the optical cross bar switch 70 (optical switch 70) for use with one embodiment the present invention. Other embodiments of an optical switch 70 can be used in conjunction with the present invention. Optical cross bar switch 70, of the FIG. 14 embodiment, includes an optical cross bar 72 and a controller module 38, and can include one or more optional optical receivers 74 at the input of the switch 70 and one or more optional optical transmitters 76 at the output of the switch 70. In the FIG. 14 embodiment, controller module 38 is an integral part of the optical cross bar switch 70 (rather than a part of the core controller 40). Switch links 36 connect from the switch controller 38 to the optical cross-bar 72. While the optical receivers( ) 74 and optical transmitter(s) 76 are optional, these devices can be used, to filter and/or amplify the signals in the optical $\mu\lambda$ upon receipt at the optical cross bar switch 70 (i.e., at the optical receiver(s) 74) and just prior to exiting the optical cross bar switch 70 (i.e., at the optical transmitter(s) 76) as necessary depending on the noise in the signals and the distance the signals must travel.

Optical cross bar 72 includes an N×M switching matrix, where "N" can be the number of input data links and "M" can be the number of output data links serviced by the optical router 50. For the sake of explanation, the embodiment of FIG. 14 shows a 16×16 matrix of switching elements 78 in the optical cross bar 72 (i.e., an N×M matrix corresponding to a optical core node 50 having sixteen ingress edge units and sixteen egress edge units). However, it should be understood that the optical cross bar switch 72 can comprise any N×M matrix. While the switching elements 78 can be semiconductor (silicon) optical amplifiers (SOAs), it should be understood that other switching elements that are capable of transporting the data through the optical cross bar switch 70 can also be used.

In the FIG. 14 embodiment, the switching elements 78 are shown as sixteen input, one output SOAs (16×1 SOAs) that are capable of routing any of sixteen inputs to its single output. Thus, the optical cross bar 72 comprises a set of sixteen switching elements 78 or SOAs 78, each of which is connected to sixteen switch input lines 52 (labeled 52-1, 52-2 . . . 52-16) and a single switch output line 54 (labeled 54-1, 54-2 . . . 54-16). Each of the sixteen SOAs 78 comprises sixteen path switches 56 where one path switch 56 is located at each intersection of an input line 52 and an output line 54 within each SOA 78. Closing an individual path switch 56 will allow $\mu\lambda$s to flow through that path switch 56 (i.e., in from the input line 52 and out the output line 54 at that path switch 56 intersection), while opening a particular path switch 56 will prevent $\mu\lambda$s from traveling down the output line 54 intersecting that particular path switch 56. This "cross-bar" configuration of the optical cross bar switch 70 allows for any particular $\mu\lambda$ to travel from any input 52 to any output 54 of the optical cross bar switch 70 along a unique path. Thus, in a 16×16 switch matrix, using sixteen 16 to 1 switching elements 78, there are two hundred fifty six unique paths. As the ability to send a greater number of wavelengths across a single optical fiber increases, the architecture of the optical switch core 30, incorporating an optical cross bar 72, will process this increases number of wavelengths equally efficiently without changing the optical switch core base architecture.

It should be understood that the embodiment of the optical cross bar switch 70 shown in FIG. 14 comprising an optical cross bar 72 is only one example of a switch fabric 70 that can be used in conjunction with the present invention. Other non-blocking (and even blocking) switch architectures can be used to accomplish the increased switching capabilities of the present invention (e.g., multi-stage switches, switches with optical buffering, etc.). Furthermore, even the embodiment of the optical cross bar 72 of FIG. 14 incorporating sixteen 16×1 SOAs is merely exemplary as other switching element configurations that can pass any input to any output of the optical switch 70, in preferably a non-blocking manner, are equally applicable to the present invention. For example, the optical switch 70 could comprise two hundred fifty six individual switching elements (or SOAs) to form a similar cross-connected optical switch 70 with paths from any input to any output. Furthermore, it should be understood that the optical cross bar 72 provides a configuration that facilitates broadcasting and multicasting of data packets. Due to the cross-bar nature of the switch 70, any $\mu\lambda$ input to the optical cross bar 72 at a particular input 52 can be sent out any single output 54, all outputs 54 simultaneously, or to some selection of the total number of outputs 54 (e.g., a $\mu\lambda$ arriving at from switch input line 52-1 can be replicated sixteen times and sent through each of switch output lines 54-1 through 54-16 simultaneously for a broadcast message). The optical cross bar 72 provided in FIG. 14 provides the additional advantage of being single-stage switch that is non-blocking without using buffering in the optical switch.

Generally, in operation the us are received at the optical receiver(s) 74 on the ingress side, amplified and/or filtered as necessary, and transmitted through the optical cross bar 72 to the optical transmitter(s) 76 on the egress side of the optical switch 70. In the FIG. 14 embodiment, switch controller 38 communicates with the optical cross bar 72 through one of sixteen switch links 36 as shown. Each of the sixteen switch links 36 connects to one of the SOAs 78 to open or close, as appropriate, the sixteen path switches 56 within the SOA 78. For example, if a $\mu\lambda$s needed to be sent from ingress edge unit I1 (FIG. 6) to egress edge unit E1 (FIG. 6), switch controller 38 would close path switch 56 at the intersection of 52-1 and 54-1 which would send the $\mu\lambda$ from the optical receiver 74 to the optical cross bar 72 along input line 52-1 to output line 54-1 and to optical transmitter 76 out of optical cross bar 72. During operation, for any particular N×1 SOA 78, only one switch 56 will be closed at any one time, and subsequently only one path is available through any one SOA 78 at any given time.

When the μλs are received from the ingress edge units 60, these μλs can be routed through the optical cross bar switch 70 in a manner that avoids contention. The FIG. 14 embodiment of the optical cross bar switch 70 accomplishes this contention-free routing using the optical cross bar 72. The optical cross bar 72 provides a unique path through the optical cross bar switch 70 between every ingress edge unit 60 and every egress interface edge unit 60. Thus, the flow path for a μλ runs from one ingress edge unit 60 through the ingress μλ link 32 associated with that ingress edge unit 60 to the optical cross bar 72, through the unique path within the optical crossbar switch 70 to one egress edge unit 60 over its associated egress μλ link 32. In this manner, μλs from ingress edge unit I1 that are intended for egress edge unit E2 travel a distinct route through the optical cross bar 72 (versus, for example, data packets from ingress 116 that are also intended for egress E2), so that contention physically cannot occur in the optical cross bar 72 between different ingress edge units 60 sending data to the same egress edge unit 60.

The switch controller 38 can operate on two different time scales: one for the data path control and one for the control path control. For the data path, the switch controller 38 will apply a dynamic set of commands to the optical cross bar 72 to operate the switching elements 78 within the optical switch 70 at wire speeds (i.e., switching the incoming μλ from input 52 to output 54 at the rate at which the μλ are arriving at the optical cross bar 72) in order to open and close the unique paths that the micro lambdas need to travel in order to get from an ingress edge unit 60 to an egress edge unit 60. For the control path, the switch controller 38 will apply a continually changing "pattern" to the optical cross bar 72 to schedule the μλ transmission from the ingress edge units 60 over the ingress μλ links 32 through the optical cross bar switch 70 and over the egress μλ links 32 to the egress edge units 60 in a manner that avoids contention. These scheduling patterns are determined by the core scheduler 42 over time and provided to the switch controller 38. Thus, the pattern applied by the switch controller 38 to the optical cross bar 72 can change over time as determined by the core scheduler 42 in response to control data received from the ingress edge units 60 (e.g., from port schedulers 46 and edge schedulers 44).

In one embodiment, the wave slots may be one microsecond in duration (including a guard band gap between each μλ) so that the optical cross bar switch 70 must be able to switch every input 52 to every output 54 in the optical cross bar 72 between the one microsecond boundaries. During the guard band gap, the optical cross bar switch 70 must switch all or a portion of the switching elements 78 to change the entire optical cross bar switch 70 configuration. In contrast, the core scheduler 42 may be determining and applying updated JIT scheduling patterns (based on different data flow detected at the ingress edge units) for time periods on the order of, for example, 1-10 milliseconds. Thus, the core scheduler 42 may be providing, to the ingress edge units 60, a new "pattern" every 1-10 milliseconds, while providing the switch controller 38 a switching signal based on the active pattern that causes the switch controller 38 to update the optical cross-bar 72 configuration every 1 microsecond.

Thus, the non-blocking feature of the present invention can be accomplished by utilizing an optical cross bar switch that is an optical TDM space switch. This optical switch fabric 30 provides scheduled data exchange between the μλ links 32 that are attached to the ingress and egress edge units 60. This can be done for each port connected via its edge unit 60 to the optical switch fabric 30. The core controller 42 communicates with each edge unit 60 via the control links 34 in order to schedule the transmission of data between the ingress (and egress functions consistent with the scheduling of the switch fabric for non-blocking data exchange between each edge unit and their associated port cards. In one embodiment, the optical cross bar switch 70 can create a single stage switch fabric.

Figure 15:
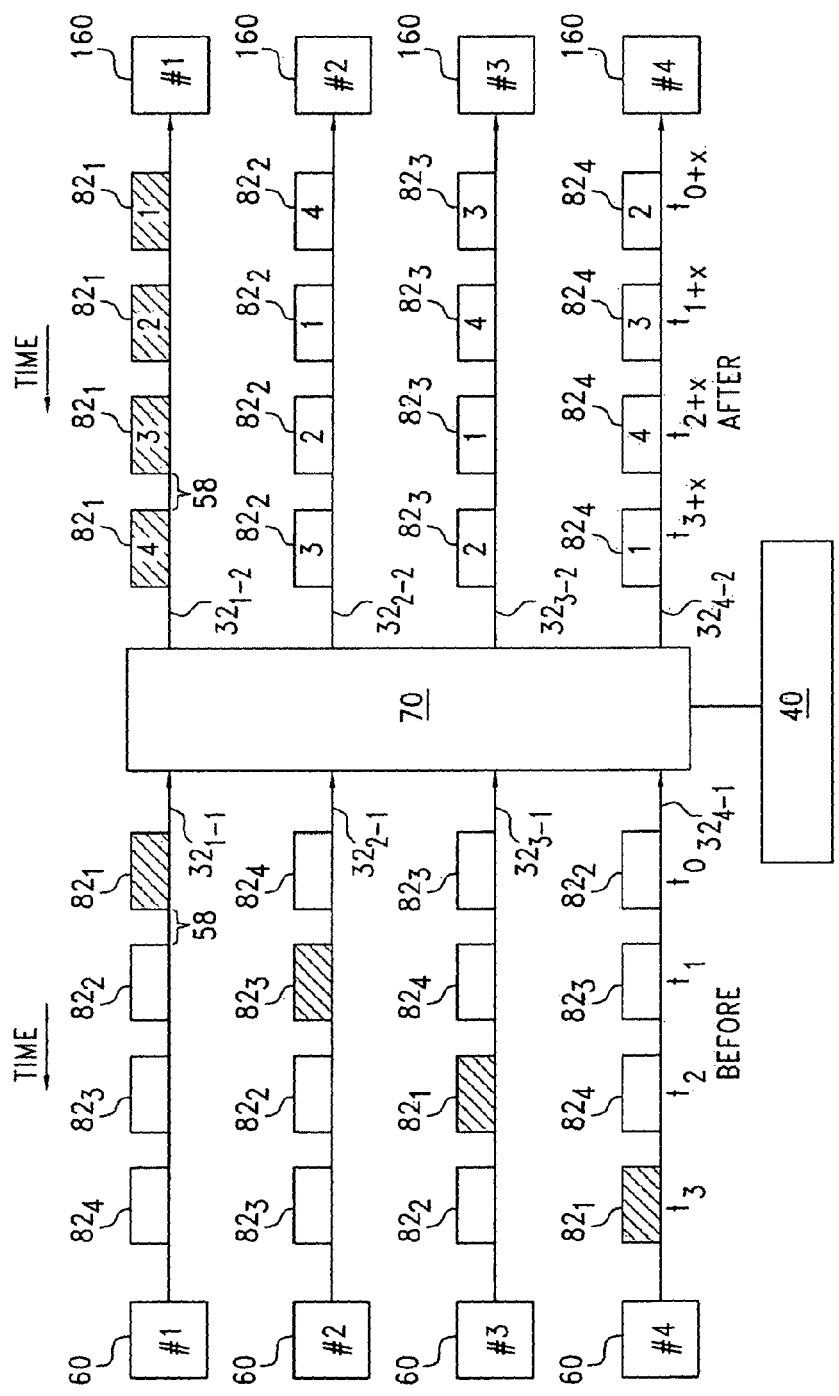
FIG. 15 shows an example of an optical switching pattern according to one embodiment of the present invention for an even traffic distribution.
Figure 17A:
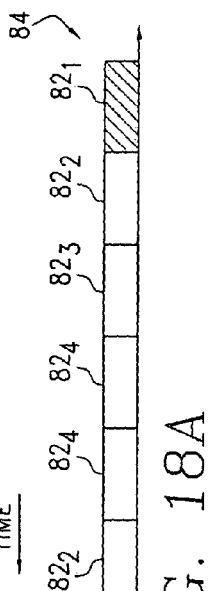
FIGS. 17 and 18 are diagrams illustrating a scheduling algorithm for a four edge unit system over a time interval that allows the building of ten μλs that produces scheduling patterns that provide non-blocking, full utilization packet switching.
Figure 17B:
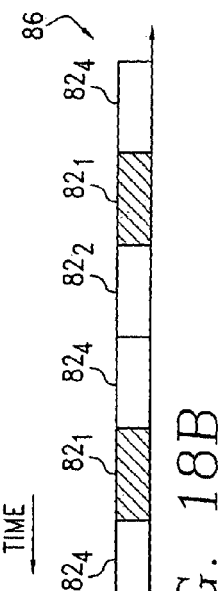
Figure 17C:
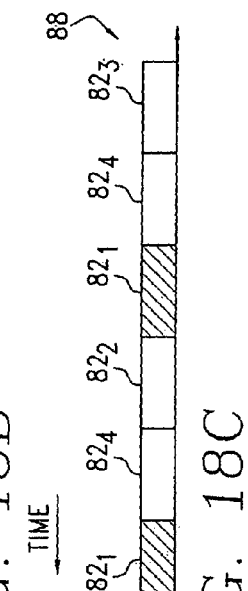
Figure 17D:
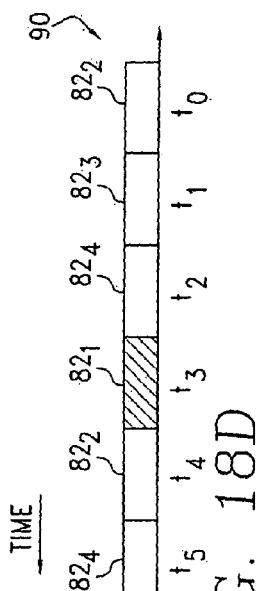
Figure 18A:
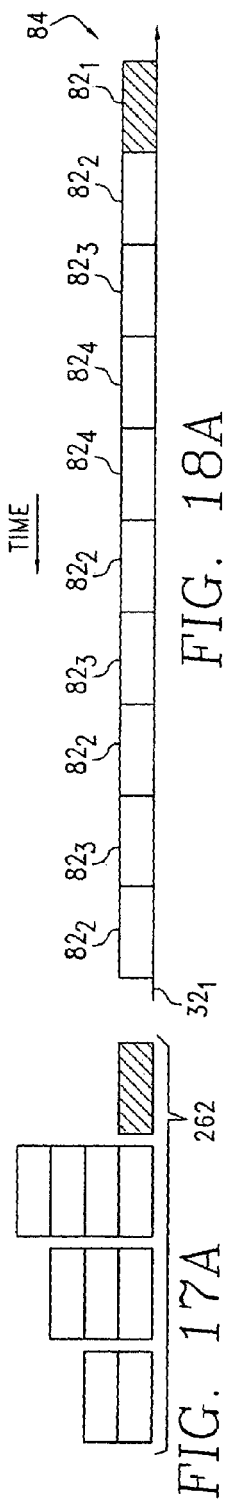
Figure 18B:
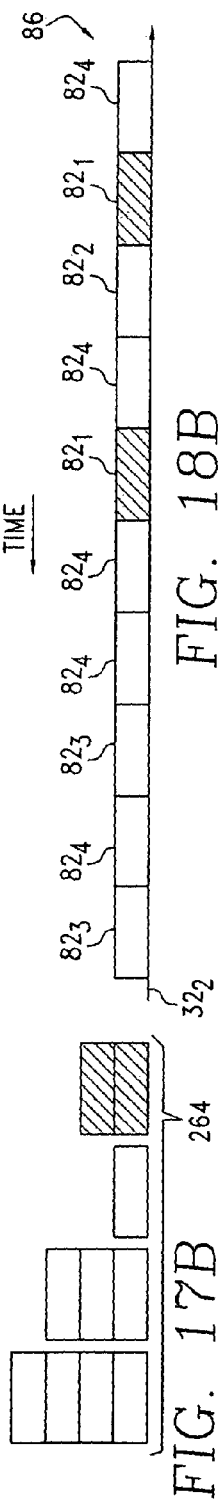
Figure 18C:
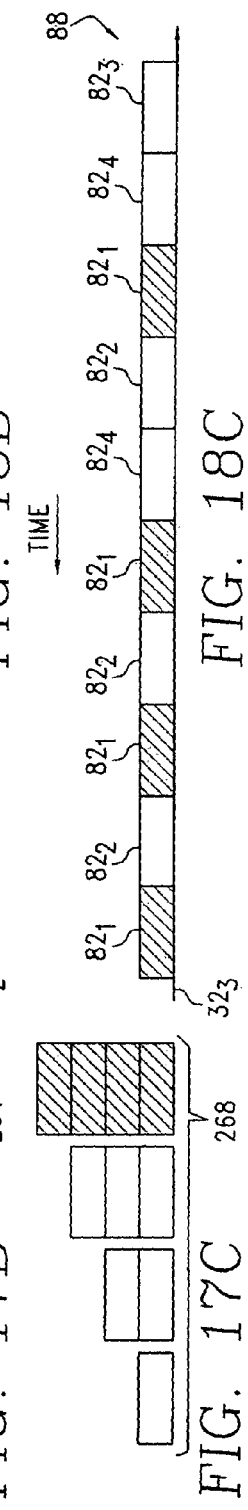
Figure 18D:
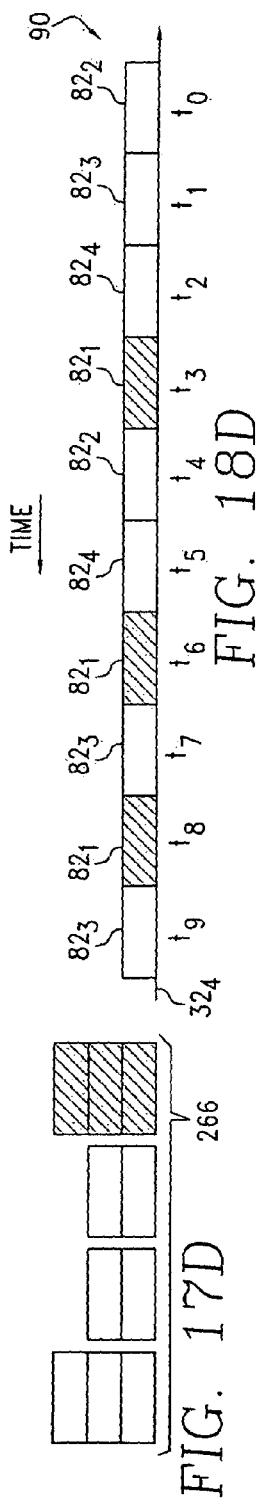

FIG. 15 illustrates the scheduling of μλ transmission from ingress edge units 60 to optical cross bar switch 70 and then to destination egress edge units 60 in a manner that avoids blocking at optical cross bar switch 70. In the embodiment of FIG. 15, a traffic distribution in which an even amount of traffic is destined to each egress edge unit 60 from each ingress edge unit 60 is assumed.

In the embodiment of FIG. 15, as the μλ 82 arrive at the optical cross bar switch 70, at any given moment in time, the optical switch 70 is always receiving four μλ, where each μλ is intended for a different egress edge unit 60. For example, at time $t_0$, μλ $82_1$ arrives on μλ link $32_{1-1}$, μλ $82_4$ arrives on ingress μλ link $32_{2-1}$, μλ $82_3$ arrives on ingress μλ link $32_{3-1}$, and μλ $82_4$ arrives on ingress μλ link $32_{4-1}$. The optical cross bar switch 70, in concert with optical core controller 40, closes the switch connecting ingress μλ link $32_{1-1}$ to egress μλ link $32_{1-2}$ to place μλ $82_1$ onto egress μλ link $32_{1-2}$ destined for the first egress edge unit 60. Similarly, the optical cross bar switch 70 switches μλ $82_4$ to egress μλ link $32_{2-2}$ destined for the second egress edge unit 60, μλ $82_3$ to egress μλ link $32_{3-2}$ destined for the third egress edge unit 60 and μλ $82_4$ to egress μλ link $32_{4-2}$ destined for the fourth egress edge unit 60. The switching within optical cross bar switch 70 can occur as described earlier.

In this even distribution scenario, since only one μλ 82 destined for any particular output address arrives at any particular time, the switching in the optical cross bar switch 70 can occur without induced delay and without contention. This is illustrated in FIG. 15 by the column of μλs 82 shown on the egress μλ links 32 at time, $t_0$+x, where x is an amount of time great enough to process the μλs through the optical cross bar switch 70. The numerals shown in each of the μλs 82 indicate the egress edge units 60 to which the μλ is destined (e.g., the subscript numeral "1" in μλ $82_1$ on egress μλ link $32_{1-2}$ at time $t_0$+x indicates that the μλ is destined for the first egress edge unit 60). Each of the μλs 82 is processed similarly so that at a time "x" later, each μλ 82 has been routed to the appropriate egress μλ link 32 connected to the egress edge unit 60 for which the μλ is destined. Thus, each of the μλs $82_1$ gets routed to the first egress edge unit 60 via egress μλ link $32_{1-2}$. FIG. 15 illustrates a switching and routing system and method where there is no loss of μλ link capacity or loss of data, even under a one hundred percent utilization scenario. A one hundred percent utilization scenario is one in which there are no "gaps" in data out of the optical cross bar switch 70 to the egress edge units 60, other than the switching time gap 58 which is necessary under current switching technology (e.g., SOA technology and/or other switching/control technology) to prevent distortion of the μλ 82 during switching. Currently, for μλs of approximately one microsecond in duration, the switching gap required can be on the order of approximately 5-10 nanoseconds. The architecture of the present invention can use and take advantage of faster switching technologies that provide smaller switching gaps 58.

As shown in FIG. 15, at each time interval a μλ 82 from each ingress edge unit 60 is traveling to each of the four egress edge units 60 (i.e., each of the ingress and edge units is operating at one erlang). Thus, in the FIG. 15 embodiment, at each time period, the optical cross bar switch 70 is closing four switch paths simultaneously (to place each of the incoming µλs on a different egress µλ link 32) without congestion because of the non-blocking nature of the optical cross bar switch 70.

FIG. 16 shows the system of FIG. 15 operating under an uneven distribution data scenario while still obtaining one hundred percent utilization, provided that at each time interval each µλ that arrives at the optical switch 70 is destined for a different egress edge unit 60. The uneven distribution of FIG. 16 results in no µλ $82_2$ destined for the second egress edge unit over time periods $t_0$, $t_1$, $t_2$ and $t_3$ originating from the first ingress edge unit 60 (shown on µλ link $32_{1\text{-}1}$). Similarly, there is an uneven data distribution from each ingress edge unit 60 to the optical cross bar switch 70. However, at each time interval, each µλ arriving at the optical cross bar switch 70 is intended for a different egress destination. Thus, the switching within the optical cross bar switch 70 can occur as described in FIG. 14 to allow simultaneous switching of each of the arriving µλs onto a different egress µλ link 32. Thus, as in FIG. 16, the present invention achieves one hundred percent utilization with no loss of data or contention between data packets.

In the uneven data distribution case of FIG. 16, the one hundred percent utilization is accomplished by aggregating µλs at the ingress edge units 60 and sending them to the optical cross bar switch 70 so that, at any time interval, one and only one µλ arrives for each of the egress edge units 60. This is accomplished by analyzing the incoming data arriving at each of the ingress edge units and developing patterns of µλ delivery (based on destination egress edge port) from each ingress edge unit 60 to the optical cross bar switch 70. This process of analysis and pattern development is accomplished by the core controller 40 based on input from all of the ingress edge units 60. Based on this input, the core controller 40 instructs each ingress edge unit 60 how to arrange the incoming data into µλs, and at what order to send the µλs to the optical cross bar switch 70 based on the egress destination for each µλ. This results in a "pattern" for each ingress edge unit 60 that defines when each ingress edge unit 60 will send µλs to the optical cross bar switch 70. For example, in FIG. 16 at time $t_0$ µλs arrive from the four ingress edge units 60 at the optical switch fabric as follows: µλ $82_1$ arrives from ingress edge unit number 1, µλ $82_4$ arrives from ingress edge unit number 2, µλ $82_3$ arrives from ingress edge unit number 3, and µλ $82_2$ arrives from ingress edge unit number 4 (all arriving over ingress µλ link $32_{1\text{-}1}$); at time $t_1$ µλ $82_4$ arrives from ingress edge unit number 1, µλ $82_3$ arrives from ingress edge unit number 2, µλ $82_2$ arrives from ingress edge unit number 3, and µλ $82_1$ arrives from ingress edge unit number 4 (all arriving over ingress µλ link $32_{2\text{-}1}$); at time $t_2$ µλ $82_3$, arrives from ingress edge unit number 1, µλ $82_2$ arrives from ingress edge unit number 2, µλ $82_1$ arrives from ingress edge unit number 3, and µλ $82_4$ arrives from ingress edge unit number 4 (all arriving over ingress µλ link $32_{3\text{-}1}$); and at time $t_3$ µλ $82_4$ arrives from ingress edge unit number 1, µλ $82_3$ arrives from ingress edge unit number 2, µλ $82_2$ arrives from ingress edge unit number 3, and µλ $82_1$ arrives from ingress edge unit number 4 (all arriving over ingress µλ link $32_{4\text{-}1}$). This "pattern" of sending µλs intended for particular destinations at particular time intervals from each ingress edge unit 60 will result in all the µλs arriving at the optical cross bar switch 70 at a particular time being intended for different egress edge units 60. This, in turn, allows the non-blocking switch fabric 70 to switch each of the arriving µλs to the appropriate output egress edge unit 60 at approximately the same time and provides full utilization of the data transport capacity. Delivery of µλs to the optical cross bar switch 70 according to this "pattern" prevents collisions by ensuring that two µλs intended for the same egress edge unit 60 do not arrive at the optical cross bar switch 70 at the same time. Further, as shown in FIG. 16, the core controller 40 can impose a pattern that fully utilizes capacity (i.e., no gaps between µλs on the egress µλ links $32_{n\text{-}2}$). Thus, the present invention can avoid collisions and loss of data, while maximizing utilization through pattern development using the core controller 40 in conjunction with a non-blocking optical cross bar switch 70 and a µλ building capacity at the ingress edge units 60. This provides an advantage over previously developed optical switching and routing systems that simply minimize the number of collisions of data. In contrast, the present invention can avoid collisions altogether based on scheduling incoming data through a non-blocking optical switch 70 based on the data destinations (not just limiting collisions to statistical occurrences).

As discussed, the pattern developed by the core controller 40 is dependent upon the destination of incoming data at the ingress edge units 60 (and can be dependent on many other packet flow characteristics such as quality of service requirements and other characteristics). Thus, the pattern developed must avoid the arrival of two µλs intended for the same egress edge unit 60 at the same time. Any pattern that avoids this issue is acceptable for processing µλs from ingress to egress edge units. The pattern can be further optimized by examining other packet flow characteristics. The pattern can be updated in a regular time interval or any other metric (e.g., underutilization of an egress µλ link 32 of a particular magnitude, etc. . . . ). The period of time a pattern can remain in place can depend upon the rate of change in incoming data destination distribution across each of the ingress edge units 60 (i.e., the more consistent the data destination at each ingress edge unit 60, the longer a particular pattern can remain in effect). Furthermore, the building of µλs at the ingress edge units 60 based on destination provides the ability to maximize utilization of the data processing capacity, even when the destination distribution of incoming data at each ingress edge unit 60 is uneven. In other words, the switch core controller 40 monitors all the ingress edge units 60 to allow the data from any ingress unit 60 to be switched to any egress edge unit 60 without contention in the optical switch core fabric 70 using a "just in time" scheduling algorithm practiced by the core controller 40.

FIGS. 17 and 18 graphically show a more complex incoming data distribution at each of four ingress edge unit 60 and a scheduling algorithm that will result in no contention and one hundred percent utilization. Each ingress edge unit 60 receives enough incoming data to create and/or fill ten µλs, with an uneven distribution across the destinations of the µλs. In FIG. 17, the data distribution diagram 262 for ingress edge unit #1 shows that the incoming data at ingress edge unit #1 will create per time unit (t) one µλ $82_1$ intended for egress edge unit number 1, four µλs $82_2$ intended for egress edge unit number 2, three µλs $82_3$ intended for egress edge unit number 3, and two µλs $82_4$ intended for egress edge unit number 4. Similarly, the data distribution diagram 264 shows that the data distribution for ingress edge unit #2 is two µλs $82_1$ intended for egress edge unit number 1, one µλ $82_2$ intended for egress edge unit number 2, three µλs $82_3$ intended for egress edge unit number 3, and four µλs $82_4$ intended for egress edge unit number 4. Data distribution diagram 266 for ingress edge unit #3 shows three µλs $82_1$ intended for egress edge unit number 1, two µλs $82_2$ intended for egress edge-unit number 2, two μλs $82_3$ intended for egress edge unit number 3, and three μλs $82_4$ intended for egress edge unit number 4. Finally, data distribution diagram 268 for ingress edge unit #4 shows four μλs $82_1$ intended for egress edge unit number 1, three μλs $82_2$ intended for egress edge unit number 2, two μλs $82_3$ intended for egress edge unit number 3, and one μλ $82_4$ intended for egress edge unit number 4.

Each ingress edge unit 60 can be built to have an identical amount of bandwidth per unit of time used to transport data to the optical switch core 30. In such a case, each ingress edge unit 60 can only produce a fixed number of μλs per unit of time because of the fixed available bandwidth. In the case of FIG. 17, each ingress edge unit 60 produces ten μλs for the defined time interval. It should be understood that while each edge unit could not produce a greater number of μλs than the allocated bandwidth, each could produce fewer than the maximum number (though this would not represent a fully congested situation) and each could produce an unequal number of μλs.

FIG. 18 shows data scheduling patterns for each of the four ingress edge units 60 based on the uneven distribution described in FIG. 17 that result from a scheduling algorithm that allows for non-blocking scheduling with full utilization in a fully congested data flow scenario. In other words, the resulting scheduling patterns 84, 86, 88 and 90 will provide μλ data to the optical cross bar switch 70 so that no two μλs intended for the same egress edge unit 60 arrive at the same time and there are no data gaps (i.e., full capacity utilization) between μλs from the optical switch 70 to the egress edge units 60. Thus, if the incoming data destinations over the defined time interval continues to approximate those shown in FIG. 17, the scheduling patterns of FIG. 18 can be repeated to allow non-blocking, fully utilized μλ data switching and delivery.

As shown in FIG. 18, the scheduling pattern 84 for ingress edge unit #1 shows the outputting of μλs from ingress edge unit #1 onto ingress μλ link $32_1$ in the following order: one μλ $82_1$, one μλ $82_2$, one μλ $82_3$, two μλs $82_4$, one μλ $82_2$, one μλ $82_3$, one μλ $82_2$, one μλ $82_3$ and finally one μλ $82_2$ (where the subscript indicates the destination edge unit). The scheduling pattern 86 for ingress edge unit #2 is as follows: one μλ $82_4$, one μλ $82_1$, one μλ $82_2$, one μλ $82_3$, one μλ $82_1$, two μλs $82_4$, one μλ $82_3$, one μλ $82_4$ and finally one μλ $82_3$. The scheduling pattern 88 for ingress edge unit #3 and the scheduling pattern 90 for ingress edge unit #4 are as indicated in FIG. 18. It can easily be seen that for any selected time, these four scheduling pattern result in four μλs that are destined for a different egress edge unit 60. Thus, the four scheduling patterns 84, 86, 88 and 90 will cause μλs to be sent from the four ingress edge units in a manner that will avoid having two μλs destined for the same egress edge unit arriving at the optical cross bar switch 70 at the same time. Furthermore, the core controller 40 can utilize this algorithm to establish one hundred percent utilization (no data gaps between the optical cross bar switch 70 and the egress edge units on any egress μλ link 32). Thus, FIG. 18 illustrates another technical advantage of the present invention in that the present invention can run in a congested mode (i.e., full utilization) at all times with no packet collision or loss of data. This full utilization maximizes the throughput of data over the available capacity.

Thus far, the present invention has been described as routing μλs from an ingress edge unit (and ingress port therein unit) to an egress edge unit (and egress port therein), embodiments of the present invention are configurable to employ slot deflection routing in which "orphan" data packets are routed in μλ form through an intermediate edge unit. The slot deflection routing capability can be utilized can be utilized in those cases where no JIT schedule is desired or justified to handle the orphan packages.

Figure 19:
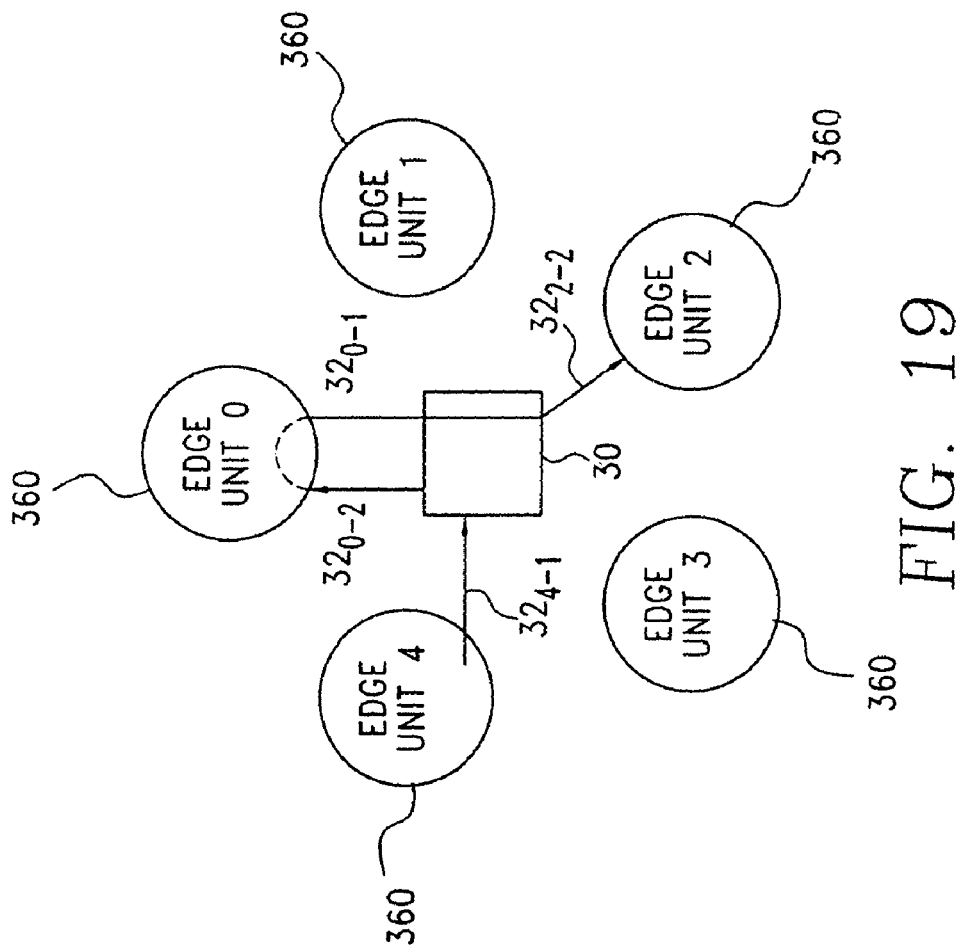
FIG. 19 shows an embodiment of the present invention, the incorporates slot deflection routing.

The router 50 of the present invention can use slot deflection routing to route μλ an ingress edge unit to a destination egress edge units through an intermediate edge unit(s) to increase performance of the router 50. FIG. 19 shows an embodiment of the router 50 that utilizes slot routing as opposed to slot deflection routing as opposed to slot deflection routing. FIG. 19 shows multiple edge units 360 connected to one another through the optical switch core 30. Edge units 360 comprise both an ingress edge unit 60 and an egress edge unit 60 so that the functionality of the ingress edge unit 60 and egress edge unit 60 are combined within edge unit 360. Each edge unit 360 has a bi-directional path (input and output) through optical core 30. With reference to FIG. 19, the output path from the ingress function within the edge unit 360 is an ingress μλ link 32, while the input to the egress function within the edge unit 360 is via an egress μλ link 33. Each edge unit 360 also has connectivity between the ingress edge unit 60 and the ingress edge unit 160 within edge unit 360 to allow for exchanging a μλ from an egress edge unit 60 to an egress edge unit 60 for re-transmission to another edge unit 360.

The following example is used to illustrate both slot routing and slot deflection routing. With reference to FIG. 19, in ordinary slot routing, a μλ from edge unit number 4 that is intended for edge unit number 2 would be routed from edge unit number 4 via ingress μλ link 32 to optical switch core 30. At the optical switch core, the μλ would be switched onto the egress μλ link 32 connected to edge unit number 2 and forwarded to edge unit number 2 for further processing.

In contrast to slot routing, deflection slot routing involves routing a μλ that is intended for a destination edge unit 360 from the source edge unit 360 through another intermediate edge unit 360, and from the intermediate edge unit 360 to the destination edge unit 360. While the present invention can utilize either slot routing or deflection slot routing, slot routing may not always be the most efficient method. For example, the router may not be load balanced if a particular μλ link needs to transport an amount of data in excess of the μλ link's capacity. Also, a particular link may not be carrying data or may be required to carry some nominal amount of data according to a particular scheduling pattern (the link is "underutilized"). In yet another example, a particular link may simply fail so that no traffic may be carried over that link. One solution to these and other problems is to use deflection routing. With slot deflection routing, if a link between two edge units 360 fails, a μλ to be sent between the edge units can be sent through a different edge unit 40.

With reference to FIG. 19 for the previous example, presume that for some reason, the most efficient manner to get the μλ from edge unit No. 4 to edge unit No. 2 is to first route (i.e., deflect) the μλ to edge unit No. 0 and then from edge unit No. 0 to edge unit No. 2. In one embodiment, the edge unit No 4 would process the μλ from its ingress edge unit 60 over ingress μλ link 32 to the optical switch core 30 just as in the ordinary slot routing. However, in contrast to ordinary slot routing, the optical switch core 30 will now route the μλ to edge unit No. 0 over egress μλ link 32 to egress edge unit edge unit No. 0. The edge unit No. 0 will then route the μλ internally from its egress edge unit 60 to its ingress edge unit 60. This allows the μλ to be transmitted from an input or receiving module in the edge unit 360 to an output capable or sending module in the edge unit 360. Egress edge unit 60 of edge unit No. 0 can now route the μλ to edge unit No. 2 in the ordinary manner described previously. It should be understood that while a particular embodiment of deflection routing has been described, that other mechanisms of routing to an intermediate edge unit 360 can easily be incorporated to accomplish this deflection routing.

Figure 20A:
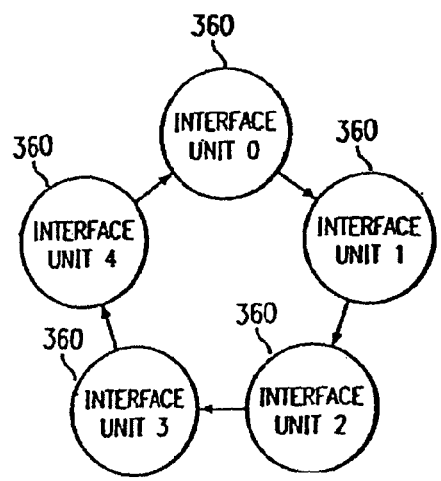
FIGS. 20a-20d show examples of scheduling patterns that can be used in conjunction with deflection routing according to the present invention.
Figure 20B:
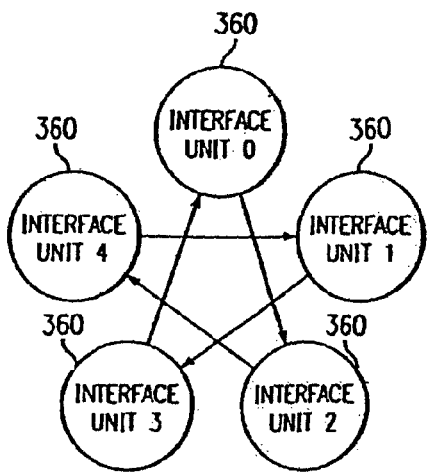
Figure 20C:
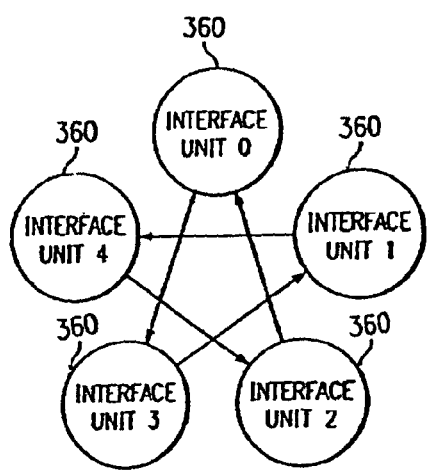
Figure 20D:
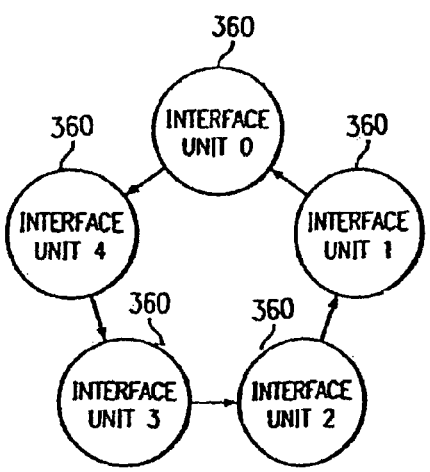

Slot routing of µλs is accomplished by initializing an optical core scheduling pattern and applying the pattern to the incoming optical data. This initial schedule can either be based on expected traffic to the router 50 or can be set according to a predetermined method (such as round robin which places each incoming µλ to the next slot in time). The router 50 then monitors the incoming data at each of the ingress edge units 60 (as described earlier) and periodically modifies the scheduling pattern based on the incoming data to allocate more capacity to incoming links having more traffic. FIGS. 20a-20d show an example of a single scheduling pattern cycle for a five edge unit 360 embodiment of the present invention. The scheduling pattern utilizes a schedule algorithm that is simple round robin and each edge unit 360 exchanges data with every other edge unit in the system. As shown in FIG. 20a, each edge unit 360 sends data to the edge unit immediately clockwise during slot 0. As shown in FIG. 20b, during slot 1 each edge unit 360 sends data to the edge unit 360 that is two edge units 360 away in the clockwise direction. FIG. 20c uses the same pattern of FIG. 28b in the opposite direction. FIG. 20d uses the pattern of FIG. 28a in the opposite direction. This pattern persists until the cycle ends, at which time each edge unit 360 has transferred one µλ to each of the other four edge units 360 (and, consequently, received one µλ from each of the other four edge units 360.)

µλ fill ratio is an important parameter relating to efficiency of bandwidth use for the present invention. Since µλs are of fixed length, and one µλ is transferred from an ingress edge unit 60 to an egress edge unit 60, traffic that does not arrive at the aggregate rate of "one µλ per slot" utilizes bandwidth inefficiently. Allocating the minimum number of slots to a virtual link between two edge units increases the µλ fill ratio and the efficiency with which bandwidth is utilized. A simple form of slot routing for a five edge unit embodiment involves each edge unit 360 having data for each of the other edge units 360 and expects data from each of the other edge units 360. One simple round robin schedule is shown in Table 1, where the left column identifies each source edge unit 360 (labeled "node") and the remaining columns indicate which edge unit 360 will receive a µλ from the source node during each slot time.

TABLE 1

Slot routing example 1; round robin schedule

| Node | Slot 0 | Slot 1 | Slot 2 | Slot 3 |
|------|--------|--------|--------|--------|
| 0    | 1      | 2      | 3      | 4      |
| 1    | 2      | 3      | 4      | 0      |
| 2    | 3      | 4      | 0      | 1      |
| 3    | 4      | 0      | 1      | 2      |
| 4    | 0      | 1      | 2      | 3      |

For example, during slot 0, edge unit number 0 sends a µλ to edge unit number 1, while in slot 1 edge unit number 0 sends a µλ to edge unit number 2, and so forth. The result is a virtual, fully connected mesh between all five edge units 360 (numbered 0-4). Thus, each link in the virtual full mesh, using the round robin schedule in Table 1, is allocated one quarter of the maximum possible switch capacity, as shown in Table 2.

TABLE 2

Distribution of link capacity for round robin schedule

| Node | 0     | 1     | 2     | 3     | 4     |
|------|-------|-------|-------|-------|-------|
| 0    | -     | 0.250 | 0.250 | 0.250 | 0.250 |
| 1    | 0.250 | -     | 0.250 | 0.250 | 0.250 |
| 2    | 0.250 | 0.250 | -     | 0.250 | 0.250 |
| 3    | 0.250 | 0.250 | 0.250 | -     | 0.250 |
| 4    | 0.250 | 0.250 | 0.250 | 0.250 | -     |

Thus, for evenly balanced traffic, the simple round robin schedule can optimize bandwidth utilization. However, evenly balanced traffic is rare. When traffic is not evenly balanced, adjustments to the scheduling pattern can be altered to provide additional bandwidth to the more heavily utilized virtual links.

An example of a more complex scheduling pattern for a five edge unit 360 configuration is shown in Table 3, where a weighted round robin schedule is illustrated. In the example of Table 3, the scheduling pattern is six slots long, rather than four as in Table 1, and all of the edge units 360 are allocated at least one slot to send µλs to each of the other four edge units 360. In addition, edge unit number 0 is allocated extra slots to edge unit number 2 and edge unit number 3, while edge unit number 1 is allocated two extra slots to edge unit number 4. The other edge units 360 have no need for additional bandwidth, but since the router 50 must connect each edge unit 360 somewhere during each slot, unused capacity exists in several of the virtual links (see the shaded entries in Table 3).

TABLE 3

Slot routing example 2; weighted round robin schedule

| Node | Slot 0 | Slot 1 | Slot 2 | Slot 3 | Slot 4 | Slot 5 |
|------|--------|--------|--------|--------|--------|--------|
| 0    | 1      | 2      | 3      | 4      | 2      | 3      |
| 1    | 2      | 3      | 4      | 0      | 4      | 4      |
| 2    | 3      | 4      | 0      | 1      | 0      | 0      |
| 3    | 4      | 0      | 1      | 2      | 1      | 1      |
| 4    | 0      | 1      | 2      | 3      | 3      | 2      |

As in the case of the simple round robin schedule of Table 1, the weighted round robin schedule results in a virtual, fully connected, mesh between all edge units 360. Each link in the virtual full mesh, using the specific scheduling pattern of Table 3, gets allocated a variable portion of the maximum possible switch capacity, as shown in Table 4. Table 4 shows four shaded entries that comprise bandwidth in excess of requirements for the virtual link.

TABLE 4

Distribution of link capacity for
example weighted round robin schedule

| Node | 0 | 1 | 2 | 3 | 4 |
|---|---|---|---|---|---|
| 0 | - | 0.167 | 0.333 | 0.333 | 0.167 |
| 1 | 0.167 | - | 0.167 | 0.167 | 0.500 |
| 2 | 0.500 | 0.167 | - | 0.167 | 0.167 |
| 3 | 0.167 | 0.500 | 0.167 | - | 0.167 |
| 4 | 0.167 | 0.167 | 0.333 | 0.333 | - |

Table 4 shows that the minimum unit of core bandwidth that can be allocated to a virtual link is reduced to 0.167 from 0.25 (as compared to Table 2) to manage $\mu\lambda$ fill ratio.

For slot deflection routing, consider again the five edge unit 360 embodiment, with an active weighted round robin schedule as in Table 3 and provides the bandwidth allocation of Table 4. Slot deflection routing provides a means for responding to changes in traffic without computing a new scheduling pattern to provide rapid response to transient traffic demands. For example, suppose that the initial traffic distribution includes the following demand for data from edge unit number 2 to edge unit number 0, edge unit number 2 to edge unit number 3, and edge unit number 0 to edge unit number 3:

2→0:0.167 (fill ratio 0.333)

2→3:0.167 (fill ratio 1.000)

0→3:0.167 (fill ratio 0.500)

Now consider a doubling in traffic from edge unit number 2 to edge unit number 3. Since the virtual link from edge unit number 2 to edge unit number 3 has only 0.167 capacity, for the pure slot routing case there would be no option except to drop packets until a new scheduling pattern could be computed by the core. Using slot deflection routing, the new traffic can be handled without dropping packets and without requiring a new scheduling pattern to be calculated.

Table 4 shows that the virtual link from edge unit number 2 to edge unit number 0 has a capacity of 0.500, but only half of the capacity is being utilized. The link from edge unit number 0 to edge unit number 3 is also underutilized. By routing the new traffic from edge unit number 2 through edge unit number 0 to edge unit number 3, the following bandwidth demand is realized:

−2→0:0.333 (fill ratio 0.666)

−2→3:0.167 (fill ratio 1.000)

−0→3:0.333 (fill ratio 1.000)

Note that the fill ratio of each link has increased, while no change in the scheduling pattern is required to respond to an increase in traffic and avoid dropping any packets.

Slot deflection routing also provides a means to rapidly respond to certain failures in the core. Once again, assume the initial traffic distribution as follows:

2→0:0.167 (fill ratio 0.333)

2→3:0.167 (fill ratio 1.000)

0→3:0.167 (fill ratio 0.500)

Now consider a failure in the link from edge unit number 2 to edge unit number 3. Again, for the slot routing case there would be no option except to drop packets until a new scheduling pattern can be implemented, but slot deflection routing can answer this failure.

Once again, from Table 4, the virtual link from edge unit number 2 to edge unit number 0 has a capacity of 0.500, but only half of the capacity is being utilized. The link from edge unit number 0 to edge unit number 3 is also underutilized. By routing the new traffic from edge unit number 2 through edge unit number 0 to edge unit number 3, the following bandwidth demand is realized:

2→0:0.500 (fill ratio 0.666)

2→3:0.000 (fill ratio 0.000)

0→3:0.500 (fill ratio 1.000)

Once again, the fill ratio of each link has increased, while no change in scheduling pattern is required to respond to a failed link.

The previous examples of slot deflection routing are provided by way of example, and the present invention can employ other methods of slot deflection routing, such as those described in U.S. patent application Ser. No. 10/114,564, "A System and Method for Slot Deflection Routing," filed Apr. 2, 2002 which is hereby fully incorporated by reference.

One embodiment of the present invention includes a router comprising an ingress edge unit with one or more ports and an egress edge unit with one or more ports connected by a switch fabric. The ingress edge unit can receive optical data and convert the optical data into a plurality of micro lambdas, each micro lambda containing data destined for a particular egress edge port. The ingress edge unit can convert the incoming data to micro lambdas by generating a series of short term parallel data bursts across multiple wavelengths. The ingress edge unit can also wavelength division multiplex and time domain multiplex each micro lambda for transmission to the switch fabric in a particular order. The switch fabric can receive the plurality of micro lambdas and route the plurality of micro lambdas to the plurality of egress edge units in a non-blocking manner. The router can also include a core controller that receives scheduling information from the plurality of ingress edge units and egress edge units. Based on the scheduling information, the core controller can develop a schedule pattern (i.e., a TWDM cycle) to coordinate the time domain multiplexing of micro lambdas at the plurality of ingress edge units and non-blocking switching of the micro, lambdas at the switch fabric.

In one embodiment of the present invention, prior to creating micro lambdas from incoming data, each ingress edge unit can create a plurality of subflows from the incoming data. Each subflow can contain data destined for a particular egress edge port and can be the basis for the generation of a micro lambda. Each ingress edge unit can covert subflows at that edge unit into a micro lambda according to the schedule received from the core controller (i.e., can convert a serial subflow into a shorter duration parallel bit stream). It should be noted that either the subflows or the micro lambdas (or both) can be rearranged to achieve a particular transmission order (i.e., time domain multiplexing can occur at the subflow stage or the micro lambda stage).

Subflows can be created at each port of an ingress edge router. Because, as discussed above, each subflow can contain data destined for a particular egress port, subflows can be routed from port to port (in micro lambda format). This increases the flexibility of embodiments of the present invention by allowing each ingress port to communicate data to each egress port (over one or more TWDM cycles). Furthermore, embodiments of the present invention eliminate (or substantially reduce) contention at the switch fabric, thereby increasing throughput and bandwidth efficiency.

Although the present invention has been described in detail, it should be understood that various changes, substitutions and alterations can be made hereto without departing from the spirit and scope of the invention as described by the appended claims.

What is claimed:

1. A router, comprising:
   a core controller;
   a plurality of egress edge units coupled to said core controller, said plurality of egress edge units including at least one egress port; and
   a plurality of ingress edge units coupled to said core controller and in communication with said plurality of egress edge units,
   wherein each ingress edge unit comprises:
   a plurality of ingress ports;
   an ingress interface associated with each ingress port, each ingress interface operable to segregate incoming optical data into a plurality of subflows, wherein each subflow contains data intended for a particular destination port; and
   a TWDM multiplexer operable to:
     receive subflows from each of the ingress interfaces at the corresponding ingress edge unit;
     generate a micro lambda from each received subflow;
     time multiplex each micro lambda at the corresponding ingress edge unit according to a schedule pattern received from the core controller;
     wavelength multiplex each micro lambda at the corresponding ingress edge unit; and
     transmit each micro lambda at the corresponding ingress edge unit to a switch fabric according to the schedule pattern,
   wherein each micro lambda comprises optical data intended for a particular destination port at one of the plurality of egress edge units, and
   wherein the plurality of egress edge units are configured to receive the plurality of micro lambdas and wherein each egress edge unit is configured to route micro lambdas received at the corresponding egress edge unit to the particular destination port for that micro lambda.

2. The router of claim 1, wherein the TWDM multiplexer being operable to time multiplex comprises the TWDM being operable to rearrange the micro lambdas at the corresponding ingress edge unit in the time domain.

3. The router of claim 2, wherein:
   the switch fabric is in communication with the plurality of ingress edge units and egress edge units and is configured to route each micro lambda in a non-blocking manner through the optical switch fabric to the egress edge unit associated with the particular destination port for that micro lambda; and
   wherein the core controller is configured to establish the schedule pattern for time domain multiplexing of micro lambdas to control the arrival of each of the plurality of micro lambdas at the optical switch fabric so as to avoid blocking at the optical switch fabric.

4. A router for routing optical data, comprising:
   a core controller;
   an egress edge unit coupled to said core controller and comprising a plurality of egress edge ports; and
   an ingress edge unit coupled to said core controller and comprising:
     a plurality of ingress edge ports;
     an ingress interface associated with each ingress edge port, each ingress interface operable to segregate incoming optical data into a plurality of subflows, wherein each subflow contains data intended for a particular destination port; and
   a TWDM multiplexer operable to:
     receive subflows from each of the ingress interfaces at the corresponding ingress edge unit;
     generate a micro lambda from each received subflow;
     time multiplex each micro lambda at the corresponding ingress edge unit according to a schedule pattern received from the core controller;
     wavelength multiplex each micro lambda at the corresponding ingress edge unit; and
     transmit each micro lambda at the corresponding ingress edge unit to a switch fabric according to the schedule pattern;
   wherein the egress edge unit is operable to receive each micro lambda from the ingress edge unit, time and wavelength demultiplex each micro lambda, convert each micro lambda back into the corresponding subflow, and output the subflows as a data stream.

5. The router of claim 4, wherein the switch fabric is configured to receive each micro lambda from the ingress edge unit and route each micro lambda to the egress edge unit in a non-blocking manner; and
   the core controller is configured to control the arrival of micro lambdas at the switch fabric in such a manner that each micro lambda flows from the ingress edge unit, through the switch fabric, to the egress edge unit without blocking.

6. A router, comprising:
   means for segregating incoming optical data into a plurality of subflows;
   means for generating a micro lambda from each subflow, wherein each micro lambda comprises optical data intended for a respective destination port at one of a plurality of egress edge units;
   means for time multiplexing each micro lambda according to a schedule pattern;
   means for wavelength multiplexing each micro lambda; and
   means for routing the micro lambdas to the respective destination ports.

7. The router of claim 6, further comprising means for routing the micro lambdas to the egress edge units in a non-blocking manner.

8. The router of claim 6, further comprising means for controlling the arrival of micro lambdas in such a manner that each micro lambda flows to the egress edge units without blocking.

9. A routing method comprising:
   segregating incoming optical data into a plurality of subflows;
   generating a micro lambda from each subflow, wherein each micro lambda comprises optical data intended for a respective destination port at one of a plurality of egress edge units;
   time multiplexing each micro lambda according to a schedule pattern;
   wavelength multiplexing each micro lambda; and
   routing the micro lambdas to the respective destination ports.

10. The routing method of claim 9, wherein the routing is performed in a non-blocking manner.

11. The routing method of claim 9, further comprising controlling arrival of the micro lambdas in such a manner that each micro lambda flows without blocking.

* * * * *